US012617172B2

(12) United States Patent
Giovanneschi et al.

(10) Patent No.: US 12,617,172 B2
(45) Date of Patent: May 5, 2026

(54) APPARATUS AND METHOD FOR WRAPPING A CARDBOARD BOX

(71) Applicant: EMMECI S.P.A., Cerreto Guidi (IT)

(72) Inventors: Alessio Giovanneschi, Montopoli In Val D'Arno (IT); Pablo Baroni, Vicopisano (IT)

(73) Assignee: EMMECI S.P.A., Cerreto Guidi (IT)

(*) Notice: Subject to any disclaimer, the term of this patent is extended or adjusted under 35 U.S.C. 154(b) by 1 day.

(21) Appl. No.: 18/692,446

(22) PCT Filed: Sep. 16, 2022

(86) PCT No.: PCT/IB2022/058775

§ 371 (c)(1),
(2) Date: Mar. 15, 2024

(87) PCT Pub. No.: WO2023/042149

PCT Pub. Date: Mar. 23, 2023

(65) Prior Publication Data

US 2024/0375370 A1 Nov. 14, 2024

(30) Foreign Application Priority Data

Sep. 16, 2021 (IT) ........................ 102021000023846

(51) Int. Cl.
*B31B 50/54* (2017.01)
*B31B 50/26* (2017.01)
(Continued)

(52) U.S. Cl.
CPC ............ *B31B 50/54* (2017.08); *B31B 50/262* (2017.08); *B31B 50/81* (2017.08); *B31B 2105/00* (2017.08);
(Continued)

(58) Field of Classification Search
CPC ....... B31B 50/51; B31B 50/81; B31B 50/262; B31B 2105/00; B31B 2120/50; B31B 2110/30
(Continued)

(56) References Cited

U.S. PATENT DOCUMENTS 2,713,813 A * 7/1955 Triolo ..................... B31B 50/52
493/113
3,626,819 A * 12/1971 Hoyrup ................... B31B 50/00
493/132
(Continued)

FOREIGN PATENT DOCUMENTS

CN 111516295 A 8/2020
CN 111716817 B 5/2021
(Continued)

OTHER PUBLICATIONS

International Search Report and Written Opinion from PCT/IB2022/058775, Date of the actual completion of the International Search: Dec. 13, 2022, Date of mailing of the international search report: Dec. 21, 2022, 7 Pages.
(Continued)

*Primary Examiner* — Sameh Tawfik
(74) *Attorney, Agent, or Firm* — Chrisman Gallo Tochtrop LLC

(57) ABSTRACT

An apparatus (1) for automatic wrapping of a wrapping blank (3) on lateral walls of a cardboard box (2), the wrapping blank (3) having a base (301) and a plurality of flaps (302, 303, 304, 305) connected thereto, comprises a plurality of folding heads (5) for folding the flaps of the wrapping blank (3) and tucking in their outer portions. Each folding head (5) includes a pair of fingers (502A), positionable inside the box (2) and movable reciprocally towards and away from each other so that the fingers (502A) can be reciprocally moved in sliding contact with the wrapping
(Continued)

blank (3) on the internal surface of the lateral wall of the box (2).

18 Claims, 16 Drawing Sheets

(51) Int. Cl.
*B31B 50/81* (2017.01)
*B31B 105/00* (2017.01)
*B31B 110/30* (2017.01)
*B31B 120/50* (2017.01)

(52) U.S. Cl.
CPC ....... *B31B 2110/30* (2017.08); *B31B 2120/50* (2017.08)

(58) Field of Classification Search
USPC .............................................................. 493/95
See application file for complete search history.

(56) References Cited

U.S. PATENT DOCUMENTS 5,632,713 A * 5/1997 Canning ................. B31B 50/26 493/137
7,805,911 B2 * 10/2010 Bassi ...................... B31B 50/44 493/111
2011/0065559 A1 * 3/2011 Atoui ...................... B31B 50/30 493/162
2015/0183177 A1 * 7/2015 Blay Orenga ........ B31B 50/064 493/137
2021/0154961 A1 * 5/2021 Giovanneschi ....... B31B 50/724
2025/0050610 A1 * 2/2025 Baroni .................. B31B 50/722

FOREIGN PATENT DOCUMENTS

IT BO2010A000658 3/2012
WO 2015079342 A1 6/2015

OTHER PUBLICATIONS

International Search Report and Written Opinion from PCT/IB2022/058777, Date of the actual completion of the International Search: Dec. 15, 2022, Date of mailing of the international search report: Dec. 23, 2022, 14 Pages.

* cited by examiner

APPARATUS AND METHOD FOR WRAPPING A CARDBOARD BOX

TECHNICAL FIELD

This invention relates to an apparatus and a method for wrapping a cardboard box.

BACKGROUND ART

In the industry, automated lines for making wrapped boxes comprise two distinct stages. In a forming stage, the boxes are formed from specially shaped paper or cardboard forming blanks consisting of a base and a plurality of flaps connected to the base and designed to be folded relative to the base to form a lateral wall of the box. In a subsequent stage, the box is wrapped by applying a pre-glued wrapping blank to it. The wrapping blank is a flat blank having a base shaped like the base of the box and flaps connected to the base and designed to be folded in such a way as to cover the lateral walls of the box.

Automated lines for making wrapped boxes comprise different stations, where respective operating machines are located. Typically, an automated line for making wrapped boxes comprises the following: a gluer for gluing the wrapping blanks, a forming machine which forms the boxes from respective cardboard blanks, a positioning device which receives the boxes from the forming machine, couples them to respective wrapping blanks received from the gluer (positioning the base of the box on the base of the flat wrapping blank) and a wrapping machine which receives from the positioning device the assembly consisting of the box coupled to the respective wrapping blank and makes the finished boxes available at the outfeed.

More specifically, wrapping includes two steps. In the first step, the side flaps of the wrapping blank are moved upwards to an erect position. In the second step, on the other hand (also referred to as tucking), the flaps are folded towards the inside of the box so that the flaps at least partly cover an inside surface of the lateral wall of the box.

Conventionally, in the wrapping stage, a die block is used which operates on the base of the box and which is movable along a vertical direction. The die block is inserted snugly into the box and held inside the box in contact with the walls and bottom of the box. The die block acts in conjunction with a plurality of folding elements to interact with the flaps of the wrapping blank to fold them upwards to a vertical position so that the flaps can then be further folded towards the inside of the box.

The applicant has noted that there is an increasing market demand for automated lines for making wrapped boxes of different formats or sizes, even in small batches, when necessary. These lines, when it comes to changeover, that is to say, changing one or more components of the line, specifically the die block, which must be the same size as the box, are flexible in terms of changing over from making boxes of a first format to making boxes of a second format.

The Applicant has observed that these operations have some disadvantages, however. Every time the format of the boxes to be made changes, an operator has to change the die block used to wrap the boxes, since the die block must be the same size as the box to be wrapped. This takes time and, what is more, makes it necessary to have (hence to keep a stock of) as many different die blocks as there are box formats to be made, with all the stock management problems that this inevitably involves.

Some solutions have therefore been developed to do away with the need for the die block. Patent documents WO2015/079342A1 and BO2010A000658, in the name of the same Applicant as the present, describe examples of known folding over or tucking devices for wrapping a box without using a die block to fold the flaps of the wrapping blank towards the inside of the box. Another example of known apparatus for wrapping a cardboard box is disclosed by patent document CN111516295A.

In this regard, however, the Applicant feels the need for further improvement in the context of wrapping without a die block, in order to tackle different problems.

One problem felt by the Applicant in the context of automated lines for making wrapped boxes is that of further reducing machine downtime during format changeover.

Another problem that the Applicant feels the need to tackle is that of making the line (with particular regard to the wrapping machine) a particularly high-performing one in terms of speed, or production capacity.

Another problem that the Applicant feels the need to tackle is that of making the line particularly flexible, that is to say, suitable for making boxes in a wide variety of formats.

Another problem that the Applicant feels the need to tackle is that of being able to make boxes of particularly high quality, for example, by minimizing creasing or other imperfections in the wrapping blank, or by making the edges and corners of the box particularly sharp ("clean edges").

DISCLOSURE OF THE INVENTION

The aim of this disclosure is to provide an apparatus and a method for wrapping cardboard boxes to improve the state of the art described above. This aim is fully achieved by the apparatus and method of this disclosure as characterized in one or more of the appended claims.

According to an aspect of it, this disclosure provides an apparatus for automatically wrapping a wrapping blank onto the lateral walls of a box. The box is made preferably of cardboard. The blank has a base and a plurality of flaps connected thereto. The blank is made preferably of paper. The box is coupled to the base of the blank. In an example embodiment, the apparatus comprises a plurality of folding heads. The plurality of folding heads is configured for performing a plurality of folding operations. The plurality of folding operations may include folding the flaps of the wrapping blank from a horizontal position to a vertical position so that an inner portion of each flap adheres to an external surface of the lateral wall of the box and an outer portion of each flap protrudes vertically from the box. The plurality of folding operations may also include folding the outer portions of the flaps from a vertical position to a horizontal position. The plurality of folding operations may also include further folding the outer portions of the flaps towards the inside of the box from the horizontal position to a vertical position, so that they adhere to an internal surface of the lateral wall of the box.

In an example embodiment, the apparatus comprises a support structure. The support structure is configured to support the base of the wrapping blank. Preferably, the support structure is configured to support the base of the wrapping blank at least at each vertex of the box. The support structure may be movable in a vertical direction, so that the wrapping blank and the box coupled to it are movable in the vertical direction. The support structure may be configured to move the wrapping blank and the box coupled to it to different heights along the vertical direction.

The apparatus may also comprise a control unit. The control unit is configured to receive input data. The input data may represent the programmed size of each box to be wrapped. The control unit is configured to derive a setting for the apparatus, based on the input data.

The apparatus may also comprise a plurality of actuators. The plurality of actuators is connected to the control unit. The plurality of actuators is configured to move the folding heads responsive to the setting of the apparatus. This makes the apparatus suitable for boxes of different sizes.

In an example embodiment, the plurality of folding heads includes pairs of folding heads. For each pair of folding heads, the pairs of folding heads may operate simultaneously on a respective pair of sides of the box. The folding heads of the pair of folding heads are spaced from each other along a respective working direction.

According to an aspect of this disclosure, the support structure may include a plurality of pairs of supporting bars. Preferably, the pairs of supporting bars correspond to the plurality of pairs of folding heads. In an example embodiment, for each pair of supporting bars, the bars are oriented transversely to the working direction of the respective pair of folding heads. The supporting bars of each pair of supporting bars may be movable towards and away from each other. In an example embodiment, the supporting bars are displaceable, responsive to a setting of the apparatus, to support corresponding edges of the bottom wall of the box. This configuration allows applying the supporting bars to all kinds of boxes of different sizes and to support the sides of the box on which the pairs of folding heads operate.

Alternatively, the support structure may include a plate that supports the central part of the bottom wall of the box.

According to another aspect of this disclosure, the apparatus may comprise an arm. The arm is configured to act in conjunction with the folding heads. The arm may have at least one rotational movement. The arm is configured to move from an inactive position, where it is away from the lateral walls of the box, to an active position, where it is in contact with the internal face of the lateral wall of the box to support the internal face of the lateral wall of the box. This configuration avoids having to move the box while the flaps of the wrapping blank are being folded and thus prevents the formation of creases inside the box, especially if the paper being used for the wrapping blank is stiff.

According to an aspect of this disclosure, each folding head of the plurality of folding heads of the apparatus comprises a pair of fingers.

The fingers of each pair of fingers are movable reciprocally towards and away from each other. The pair of fingers is displaceable inside the box, so that the fingers can be reciprocally moved in sliding contact with the wrapping blank on the internal surface of the lateral wall of the box. This solution allows obtaining a more precise fold and prevents creasing when the flaps are folded towards the inside of the box.

It should be noted that the Applicant intuited that providing devices that operate on the flaps at the sides of the wrapping blank at the tucking stage, independently of the geometrical features (height, width) of the lateral walls on which these flaps are glued allows obtaining a particularly flexible line and production of constantly high quality. In this context, the Applicant has found that providing the machine with a pair of fingers that can move reciprocally in sliding contact with the flaps folded inside the box so they can be glued onto the internal surface of the box makes the tucking operation independent of the length of the lateral wall, that is to say, of the format of the box, since the fingers can be moved from a minimum distance from each other to a maximum distance that can be suitably set by the operator.

In an example embodiment, the pairs of fingers are each movable along a first axis towards and away from a corresponding wall of the box. The reciprocal movement of the fingers of the pair of fingers is along a second horizontal axis. The second horizontal axis is orthogonal to the first horizontal axis. In an example, the support structure and each pair of fingers are also movable vertically relative to each other. The support structure and each pair of fingers are movable from a raised configuration, where the pair of fingers is located above the box, to a lowered configuration, where the pair of fingers is located inside the box. This solution allows folding the outer portions of the flaps from the vertical position to the horizontal position and folding the outer portions of the flaps towards the inside of the box from the horizontal position to the vertical position, using the pair of fingers. Further, for each folding head, the fingers of the corresponding pair of fingers are movable reciprocally between a first position, where they are positioned at a reciprocal minimum distance, and a second position, where they are positioned at a reciprocal maximum distance.

Preferably, for each folding head, the pair of fingers is displaceable inside the box with the fingers at the first position. Each folding head may be configured to move the fingers away from each other from the first position to the second position, with the pair of fingers in the lowered configuration. Each folding head may be configured to move the fingers from the second position to the first position as the fingers move towards each other, with the pair of fingers in the raised configuration. This configuration allows obtaining greater efficiency and higher speed.

The plurality of actuators may include a sliding actuator. The sliding actuator is configured for moving the fingers reciprocally towards and away from each other. The sliding actuator is configured for moving the fingers between a first position, where they are positioned at a reciprocal minimum distance, and a second position, where they are positioned at a reciprocal maximum distance. The second position is set responsive to the setting of the apparatus.

In an example embodiment, the support structure is adapted for moving along the vertical direction between a first stop at a first height and a second stop at a second height. The second height is lower than the first height. Preferably, the folding heads are configured to fold the flaps of the wrapping blank from the horizontal position to the vertical position, with the support structure located at the first stop, and are configured to fold the outer portions of the flaps from the vertical position to the horizontal position, and from the horizontal position to the vertical position so that they adhere to an internal surface of the lateral wall of the box, with the support structure located at the second stop. This solution allows making wrapped boxes at a higher speed and reducing the dimensions of the apparatus. In an example embodiment, each folding head may also comprise a horizontal blade. The horizontal blade is connected to an actuator to move horizontally, parallel to the bottom wall of the box. The plate is configured to move towards and away from a corresponding wall of the box. The blade is configured to fold the outer portion of the flaps of the wrapping blank from the vertical position to the horizontal position. The blade may include a groove. The respective pair of fingers is operatively inserted inside the groove. This configuration allows folding to be performed more precisely.

According to another aspect of this disclosure, the apparatus according to one or more aspects of this disclosure may comprise a plurality of columns.

It should be noted that the columns take the place of the die block in the step of folding the lateral flaps from the horizontal to the vertical position.

In this context, the Applicant intuited that providing devices which, in the step of folding the flaps of the wrapping blank from the horizontal position to the vertical position, support the bottom wall of the box to be wrapped independently of the geometrical features (height, width) of the box, contributed to obtaining a particularly flexible line.

In this regard, the Applicant has found that providing a plurality of columns that are vertical and movable horizontally so that they can be positioned inside the box on an internal face of the bottom wall of the box and at least at each vertex of the box allows folding the flaps without using the die block and independently of the length of the lateral wall, that is, independently of the format of the box.

The plurality of columns preferably extends along the vertical direction. In an example embodiment, the plurality of columns are movable horizontally. Preferably, the columns are movable vertically relative to the folding heads. The columns of the plurality of columns can be positioned inside the box on an internal face of the bottom wall of the box. Preferably, the columns of the plurality of columns are positioned inside the box at least at each vertex of the box so that the bottom wall of the box is operatively interposed between the plurality of columns and the support structure (according to one or more aspects of this disclosure).

In an example, the apparatus also comprises a horizontal tray. The tray may be movable vertically. The plurality of columns is operatively connected to the tray.

In an example embodiment, the control unit may be programmed to move the columns horizontally, responsive to the setting of the apparatus.

In an example embodiment, the apparatus comprises a wrapping configuration. In the wrapping configuration, the plurality of columns is fixed to the tray to move along the vertical direction.

The apparatus may also comprise a setting configuration. In the setting configuration, the plurality of columns is movable horizontally relative to the tray so that the columns can be displaced horizontally. The columns can be displaced horizontally responsive to the setting of the apparatus.

In an example embodiment, the tray is provided with a central through hole. The apparatus may also comprise a rod. The rod is preferably movable along the vertical direction. The rod may pass through the central through hole in the tray. The apparatus may also comprise a disk. In an example embodiment, the disk is connected to a lower end of the rod. The disk is configured to contact a central portion of the internal face of the bottom wall of the box. Preferably, the tray is movable vertically independently of a vertical movement of the rod. It is to be mentioned that the use of said rod, provided with the disc, allows to support the bottom wall of the box in the absence of the columns. In another example of embodiment, the apparatus can be without the rod.

In an example, the plurality of columns is configured for being in contact with the internal face of the bottom wall of the box, in an active position. Furthermore, the plurality of columns is configured for being spaced from the internal face of the bottom wall of the box, in an inactive position. Preferably, the columns, in the active position, are configured for acting in conjunction with the support structure to press the bottom wall of the box interposed between them. The apparatus may include an adjustment system for format change. In an example, the adjustment system for format change is connected to the plurality of columns 7. In an example, the adjustment system for format change is also connected to the support structure 4. The adjustment system for format change is configured to adjust the movements of the plurality of columns and the support structure, to adapt their position to the type of box to be wrapped. In particular, the adjustment system for format change moves the columns, reciprocally approaching and moving away from each other. The adjustment system for format change also moves the supporting bars, reciprocally approaching and moving away from each other. In particular, the adjustment system for format change adjusts the movement of the columns and the supporting bars, in a coordinated way and so that for each box to be wrapped, the columns and respective supporting bars move simultaneously, in response to the setting of the apparatus, so that, for each box, at least in each vertex of the box, the bottom wall of the box is operatively interposed between the plurality of columns and the supporting bars.

In an example, the disk is configured to contact a central portion of the internal face of the bottom wall of the box when the columns are spaced from the box in the inactive position.

According to another aspect of this disclosure, the apparatus may comprise an infeed to receive the box and the wrapping blank coupled thereto. The infeed may extend along an advancing direction. The apparatus also comprises an outfeed to release the wrapped box.

In an example embodiment, the apparatus comprises a first wrapping station and a second wrapping station. Preferably, the first wrapping station comprises a first subset of the plurality of folding heads and the second wrapping station comprises a second subset of the plurality of folding heads. The folding heads are folding heads according to one or more of the aspects described in this disclosure. In an example embodiment, the first and the second wrapping station are spaced from each other along a horizontal direction, orthogonal to a vertical direction. The first and the second wrapping station may each comprise a respective support structure according to one or more of the aspects described in this disclosure. The apparatus may also comprise a transport device. The transport device is preferably movable relative to each support structure. The transport device is configured for transporting the box and the wrapping blank coupled thereto along the advancing direction.

Alternatively, the wrapping stations may be spaced from each other along the vertical direction.

In an example embodiment, the first wrapping station is located upstream of the second wrapping station relative to an advancing path of the box from infeed to outfeed. The transport device is configured to transport the box and the wrapping blank coupled thereto from the first wrapping station to the second wrapping station. This configuration allows the apparatus to operate at higher speeds.

Preferably, the transport device is configured to transport the box and the wrapping blank coupled thereto from the first wrapping station to the second wrapping station by a translational movement along the horizontal direction. Preferably, the transport device is configured to transport the box and the wrapping blank coupled thereto from the first wrapping station to the second wrapping station in such a way that the advancing path is aligned with the advancing direction of the box at the infeed.

In an example embodiment, the transport device is configured to grab two consecutive boxes of a succession of boxes simultaneously and to move them along the advancing path.

The apparatus may comprise an actuator for moving the transport device. The actuator is connected to the control unit. The control unit is programmed to move the transport device. Preferably, the control unit is configured to move the transport device relative to the advancing path from infeed to outfeed, forward from a first position to a second position, forward further from the second position to a third position and backwards from the third position to the first position. In each station, the support structure may be configured to support movably the base of the wrapping blank and of the box coupled thereto. In an example embodiment, in the first and the second wrapping station, the wrapping blank and the box coupled thereto are movable along a first vertical axis and a second vertical axis, respectively. In an example, the first and the second vertical axis are spaced from each other horizontally. Each wrapping station may have a first height and a second height. The second height is lower than the first height. The transport device is preferably configured to grab the box positioned at the first height. In an example embodiment, in each station, the support structure is configured to perform a downward movement to move the box from the first height to the second height, and an upward movement to move the box from the second height to the first height.

It should be noted that the Applicant intuited that providing two wrapping stations spaced from each other along a horizontal direction instead of two stations spaced from each other vertically allows obtaining a particularly fast line. In this context, the Applicant has found that by providing two wrapping stations spaced from each other along a horizontal direction so that the first station is upstream of the second station and performing a first subset of the plurality of folding operations in the first station and a second subset of the plurality of folding operations in the second station, it is possible to considerably increase production speed.

In an example, the support structure, at least in the first wrapping station, comprises a plurality of supporting bars, corresponding to the plurality of folding heads. The supporting bars are made according to one or more of the aspects described in this disclosure. The supporting bars are movable towards and away from each other so they can be displaced to support corresponding edges of a bottom wall of the box.

In an example embodiment, the folding heads comprise a plurality of tilters at least in the first wrapping station. The tilters are configured to fold the flaps of the blank from the horizontal position to the vertical position so that the inner portion of each flap adheres to the external surface of the lateral wall of the box and the outer portion of each flap protrudes vertically from the box.

The apparatus may also comprise a plurality of columns according to one or more aspects of this disclosure. The plurality of columns may comprise a first group of columns and a second group of columns. Preferably, the first and the second wrapping station comprise the first and the second group of columns, respectively. The plurality of columns is preferably oriented orthogonally to the working direction of a respective pair of folding heads in each wrapping station. In an example embodiment, the plurality of tilters and the plurality of columns may be configured to act in conjunction with each other to fold the blank from the horizontal position to the vertical position.

Further, the apparatus according to this disclosure may comprise an arm.

In an example embodiment, the plurality of folding heads includes tucking devices. The tucking devices may comprise a horizontal blade. The horizontal blade is configured to move horizontally, parallel to the bottom wall of the box. The blade is configured to rotate about an axis of rotation from a first position, where it is parallel to the bottom wall of the box, to a second position, where it is orthogonal to the bottom wall of the box, so as to fold the outer portions of the flaps from the horizontal position to the vertical position so they adhere to the internal surface of the lateral wall of the box.

Alternatively, the plurality of folding heads may include a pair of fingers according to this disclosure.

In an embodiment, the first wrapping station includes a first pair of tilters and a first pair of tucking devices and the second wrapping station includes a second pair of tilters and a second pair of tucking devices. The first pair of tilters is disposed at 90 degrees to the second pair of tilters. The first pair of tucking devices is disposed at 90 degrees to the second pair of tucking devices. This configuration allows the box to be wrapped in one pair of flaps of the blank in the first station and in another pair of flaps of the blank in the second wrapping station.

Preferably, in each wrapping station, the pair of tucking devices is spaced from the pair of tilters along the vertical direction. This solution allows reducing the dimensions of the apparatus.

In another embodiment, the first wrapping station comprises two pair of tilters and the second wrapping station comprises two pairs of tucking devices. This allows folding the flaps from the horizontal position to the vertical position in the first station and folding the flaps (or rather, tucking them) into the box in the second station.

The apparatus may also comprise an adjustment device. The adjustment device is configured to receive the box and the wrapping blank coupled thereto and to align it with a conveyor belt. The conveyor belt preferably extends along the horizontal direction.

According to an aspect of it, this disclosure provides a method for wrapping a cardboard box with a blank. The blank has a base and a plurality of flaps to be applied on the lateral walls of the box. The method comprises a step of receiving the box coupled to the base of the blank. The method comprises a step of positioning the base of the blank and the box couple thereto on a support structure. The support structure may be movable along a vertical direction.

The method comprises a step of folding the flaps of the wrapping blank from a horizontal position to a vertical position so that an inner portion of each flap adheres to an external surface of the lateral wall of the box and an outer portion of each flap protrudes vertically from the box. The method comprises a step of folding the outer portions of the flaps from the vertical position to a horizontal position. The method comprises a step of folding the outer flaps of the wrapping blank towards the inside of the box, from the horizontal position to a vertical position, so that they adhere to an internal surface of the lateral wall of the box.

The method comprises a step of providing a plurality of folding heads. The folding heads are configured for performing a plurality of folding operations. The plurality of folding operations may include folding the flaps of the wrapping blank from a horizontal position to a vertical position and folding the flaps towards the inside of the box (that is to say, tucking them in).

According to an aspect of this disclosure, the method may comprise a step of providing each folding head with a pair of fingers. The fingers of each pair of fingers may be movable reciprocally towards and away from each other.

The method also comprises a step of placing the fingers at least partially inside the box. The method comprises a step of moving the fingers reciprocally, in sliding contact with the wrapping blank on the internal surface of the lateral wall of the box.

In an example, the method may also comprise the following steps:

for each pair of fingers, moving the fingers along a first horizontal axis towards and away from a corresponding wall of the box into the horizontal position parallel to the bottom wall of the box;

for each pair of fingers, vertically moving the support structure and each pair of fingers relative to one another, from a raised configuration, where the pair of fingers is located above the box, to a lowered configuration, where the pair of fingers is located inside the box in order to fold the outer portions of the flaps into the vertical position inside the box;

for each pair of fingers, in the lowered configuration, reciprocatively moving the fingers along a second horizontal axis, orthogonal to the first horizontal axis, in sliding contact with the internal surface of the lateral wall.

In an example, in the step of placing the fingers inside the box, the pair of fingers is moved from the raised to the lowered configuration, with the fingers located in a position where the fingers are near each other, at a central portion of the corresponding lateral wall of the box. Preferably, in the lowered configuration, the fingers move alternatingly away from each other along the second horizontal axis.

The method may comprise a step in which the fingers are moved from the lowered configuration to the raised configuration when they are positioned away from each other, and in which the fingers are moved reciprocally towards each other when they are in the raised configuration.

The method may comprise a step of moving the box and the wrapping blank vertically between a first stop at a first height and a second stop at a second height lower than the first height. Preferably, the step of folding the flaps from the horizontal position to the vertical position is performed at the first stop and the step of folding the outer portions of the flaps into the box is performed at the second stop.

In an example, the step of folding the outer portions of the flaps from the vertical position to the horizontal position might be carried out by horizontal blades. Preferably, the horizontal blades move horizontally and parallel to the bottom wall of the box relative to a corresponding side of the box. Further, each pair of fingers may be operatively inserted into a groove made in a corresponding blade.

According to an aspect of this disclosure, the method may comprise a step of providing a plurality of columns. In an example, the method comprises a step of moving the columns horizontally. Preferably, the columns are moved in such a way that at least each vertex of the box is vertically aligned with a corresponding column of the plurality of columns.

The method may comprise a step of moving the columns vertically relative to the folding heads. In an example, while the flaps are being folded from the horizontal position to the vertical position, they are in contact with an internal face of the bottom wall of the box so that the bottom wall of the box is interposed between the support structure and the plurality of columns at least at every vertex of the box.

In an example, the method comprises a step of providing a horizontal tray. Preferably, the plurality of columns is connected to the tray. The step of vertically moving the columns may also comprise a step of moving the tray in the vertical direction.

Also, in an example, during the step of horizontally moving the columns relative to the tray, the columns are slidably connected to the tray. Alternatively, the step of horizontally moving the columns relative to the tray may include a step of disconnecting the columns from the tray and moving the columns horizontally relative to the tray.

The horizontal movement of the columns may be responsive to the setting of the apparatus.

The method may also comprise a step of providing the tray with a central through hole.

The method may comprise a step of providing a rod inserted through the central through hole in the tray. The method may comprise a step of providing a disk that is connected to a lower end of the rod.

In an example, the method may comprise a step of inserting the disk into the box in contact with a central portion of the internal face of the bottom wall of the box.

The method may comprise a step of moving the rod vertically independently of a vertical movement of the tray.

The method may comprise a step of moving the support structure, with the wrapping blank and the box coupled to it, along the vertical direction to different heights.

The method may also comprise a step of inserting the columns into the box so they are in contact with the internal face of the bottom wall of the box. In an example, there may be step of moving the columns downwards into an active configuration. In the active configuration, the columns are in contact with the internal face of the bottom wall of the box so that the columns act in conjunction with the support structure to press the bottom wall of the box interposed between them.

The method may also comprise a step of moving the columns upwards into an inactive configuration. In the inactive configuration, the columns are spaced from the internal face of the box.

Also, during the step of moving the columns upwards, there may be step of keeping the disk in contact with a central portion of the internal face of the bottom wall of the box.

According to an aspect of this disclosure, the method may comprise a step of receiving the box coupled to the base of the wrapping blank at an infeed. The infeed may extend along an advancing direction.

The method may also comprise a step of releasing the wrapped box at an outfeed. In an example, the method comprises a step of providing the apparatus with a first wrapping station and a second wrapping station. Further, the plurality of folding heads may comprise a first pair of folding heads, spaced from each other along a first working direction, and a second pair of folding heads, spaced from each other along a second working direction, orthogonal to the first working direction. In an example, the first pair of folding heads forms part of the first wrapping station and the second pair of folding heads forms part of the second wrapping station. In an example, for each pair of folding heads, the pairs of folding heads operate simultaneously on a respective pair of sides of the box.

In the first wrapping station, the support structure may include a first pair of supporting bars, oriented transversely to the first working direction, and, in the second wrapping station, the support structure may include a second pair of supporting bars, oriented transversely to the second working direction. The supporting bars are made according to one or more of the aspects of this disclosure.

Preferably, the first wrapping station and the second wrapping station are spaced from each other along a horizontal direction, orthogonal to a vertical direction. The method comprises a step of performing a first subset of the plurality of folding operations in the first wrapping station and performing a second subset of the plurality of folding operations in the second wrapping station. The method may comprise a step of supporting the base of the blank and of the box coupled thereto, in each wrapping station, by means of a respective support structure (according to this disclosure). The method may comprise a step of transporting the box, and the blank coupled thereto, in the advancing direction by means of a transport device that is movable relative to each of the support structures.

In an example, the first wrapping station is located upstream of the second wrapping station relative to an advancing path of the box from infeed to outfeed. In an example, a first subset of folding operations is performed in the first wrapping station and a second subset of folding operations is performed in the second wrapping station. The method may comprise a step in which the box is transported from the first wrapping station to the second wrapping station by a translational movement of the box aligned with the advancing direction of the box at the infeed.

In an example, the plurality of columns (according to this disclosure) includes a first group of columns and a second group of columns. Preferably, the first and the second wrapping station comprise the first and the second group of columns, respectively. The plurality of columns is oriented orthogonally to the working direction of the respective pair of folding heads.

More specifically, the method may comprise a step of receiving the box and the blank coupled thereto at the infeed and at a first height of the first wrapping station. The method comprises a step of folding a first pair of flaps of the wrapping blank from a horizontal position to a vertical position in the first wrapping station.

The method comprises a step of moving the box and the blank coupled thereto, together with the respective support structure, along a first vertical axis at a second height of the first wrapping station. The second height is lower than the first height.

The method also comprises a step of folding the outer portions of the first pair of flaps from a vertical position to a horizontal position and towards the inside of the box from the horizontal position to a vertical position, so that they adhere to an internal surface of the lateral wall of the box.

Preferably, the method comprises a step of moving the box to the first height of the first wrapping station. In an example, the method comprises a step of transporting the box to a first height of the second wrapping station by means of the transport device.

The method comprises a step of folding a second pair of flaps of the wrapping blank from a horizontal position to a vertical position in the second wrapping station.

The method comprises a step of moving the box and the blank coupled thereto, together with the respective support structure, along a second vertical axis at a second height of the second wrapping station. The second height is lower than the first height. In an example, the first and the second vertical axis are spaced from each other horizontally. The method also comprises a step of folding the outer portions of the second pair of flaps from a vertical position to a horizontal position and towards the inside of the box from the horizontal position to a vertical position, so that they adhere to an internal surface of the lateral wall of the box. Preferably, the method comprises a step of moving the box to the first height of the second wrapping station.

BRIEF DESCRIPTION OF DRAWINGS

This and other features will become more apparent from the following description of a preferred embodiment, illustrated by way of non-limiting example in the accompanying drawings, in which.

DETAILED DESCRIPTION OF PREFERRED EMBODIMENTS OF THE INVENTION

Figure 1:
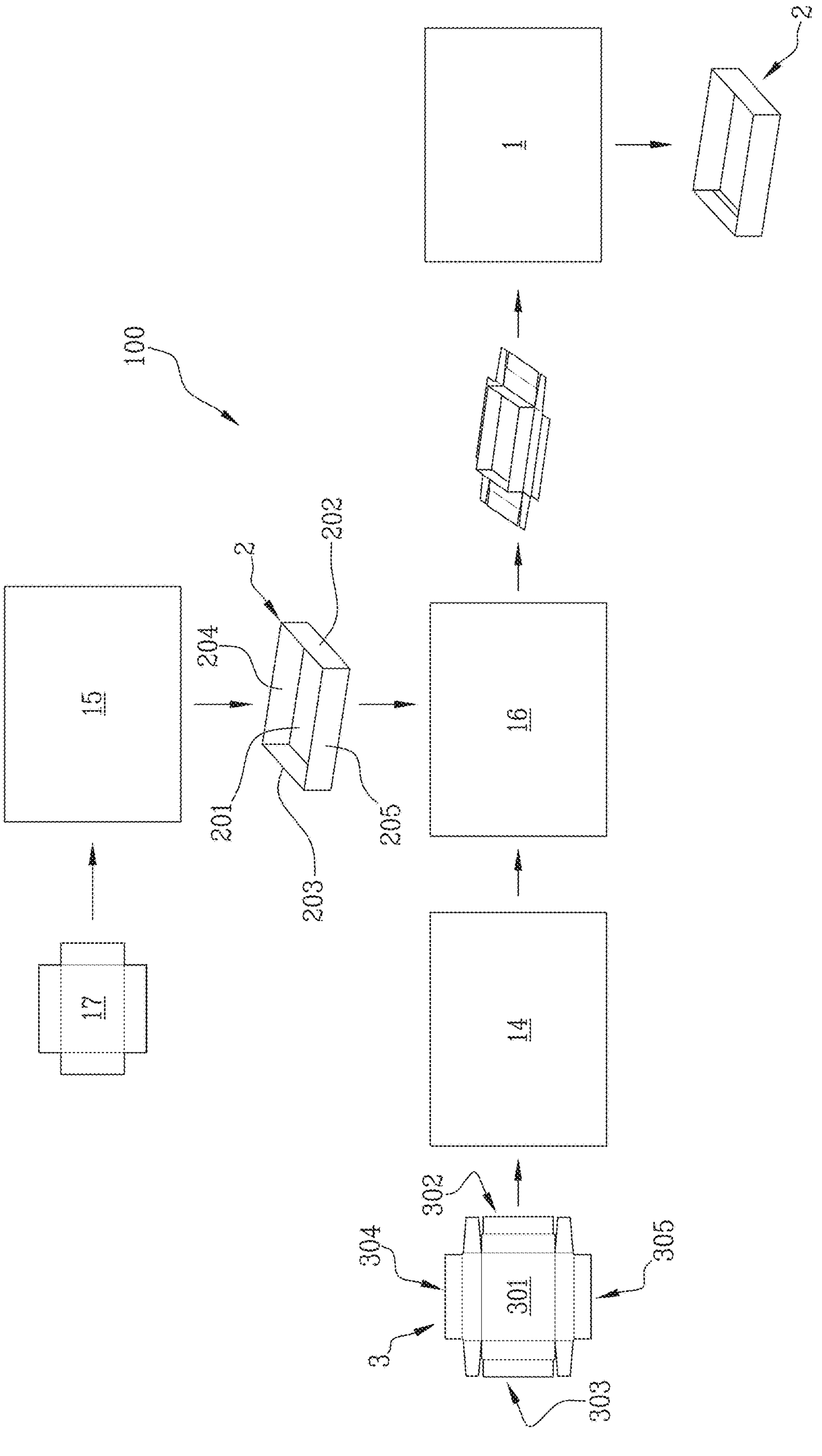
FIG. 1 shows an open wrapping blank and a cardboard box made by a forming apparatus, the box disposed with its bottom wall on the wrapping blank and the box after being wrapped with the blank by the apparatus of this invention.
Figure 2:
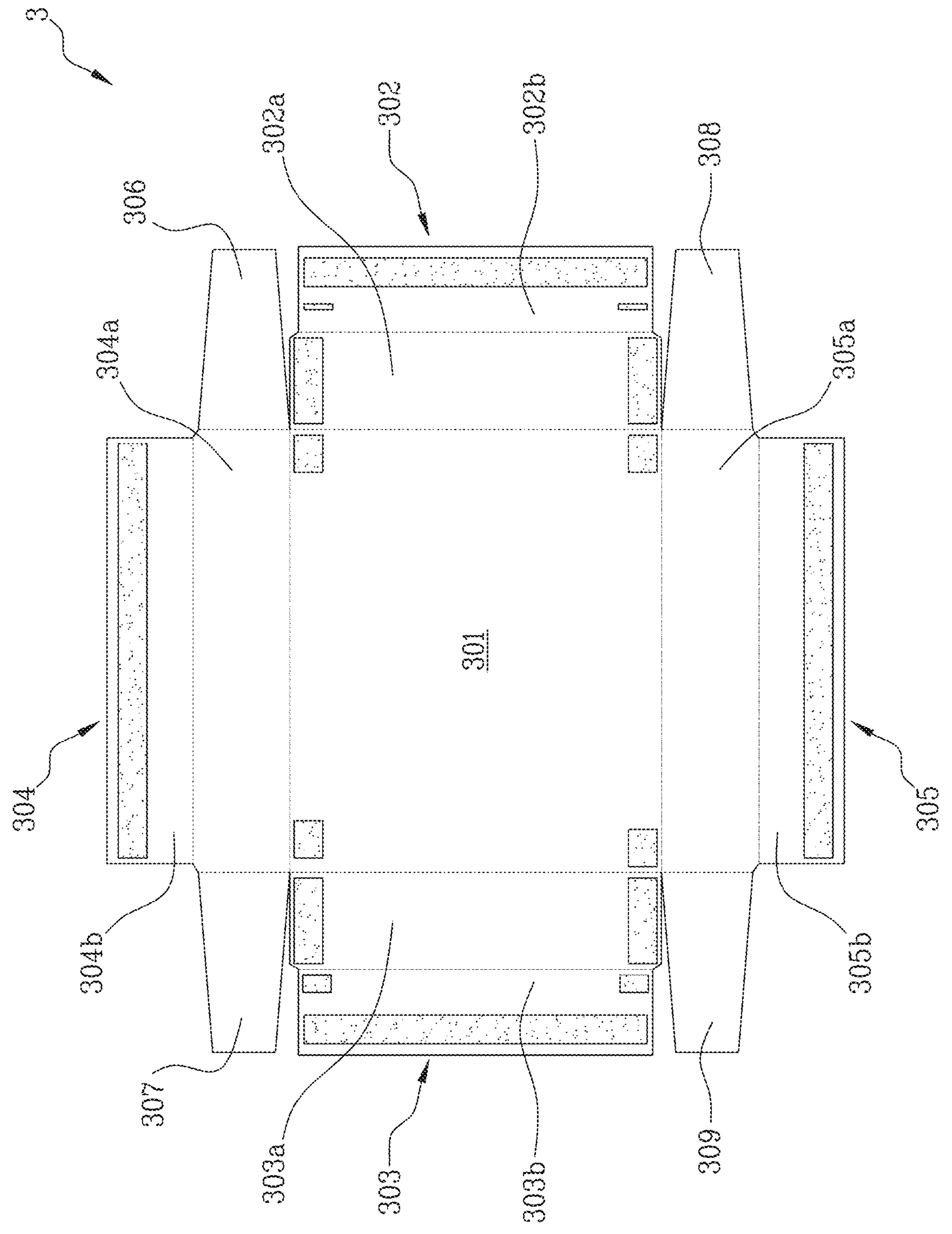
FIG. 2 shows the wrapping blank with the inner and outer portions of each flap.
Figure 3:
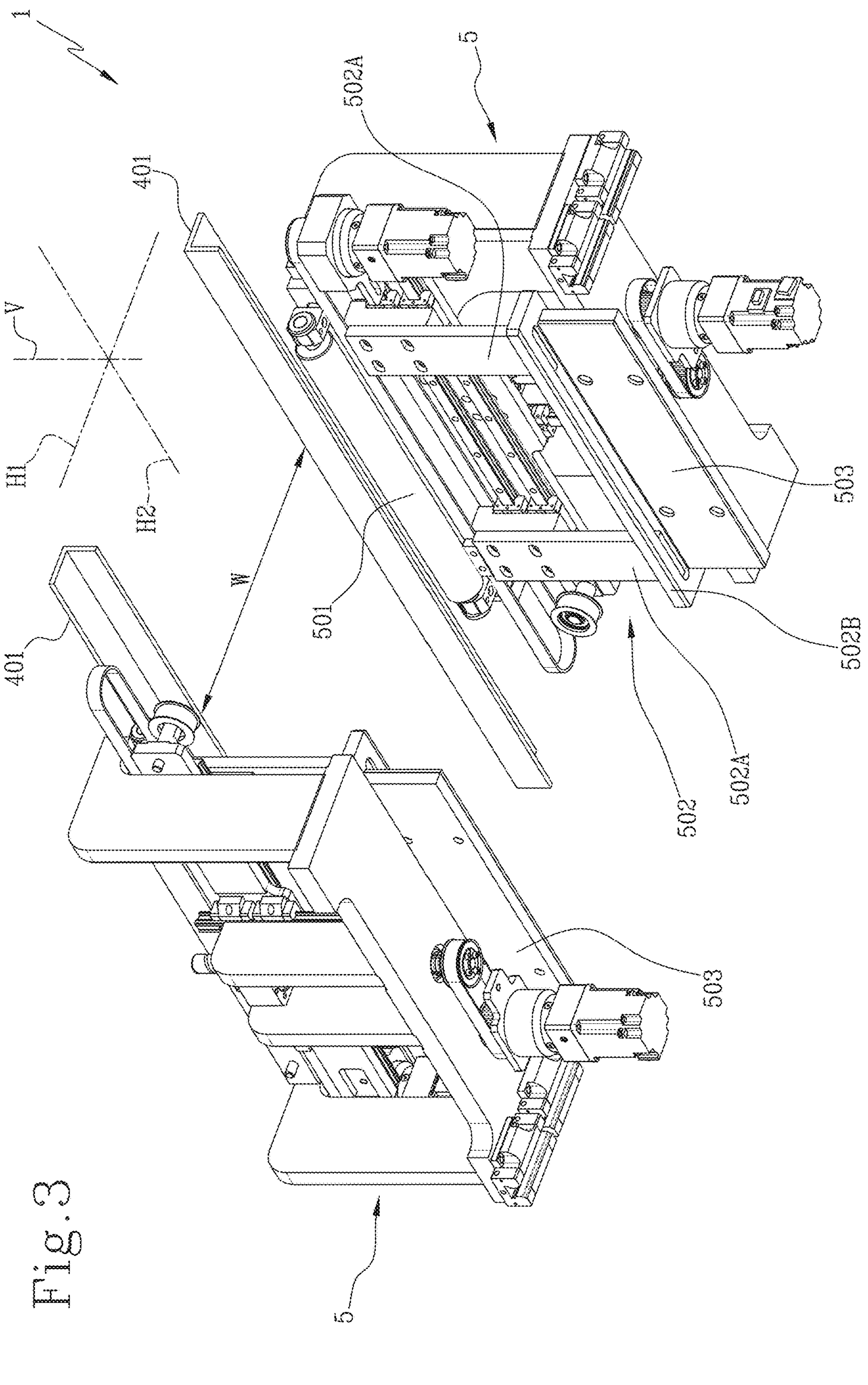
FIG. 3 shows a pair of folding heads.
Figure 4:
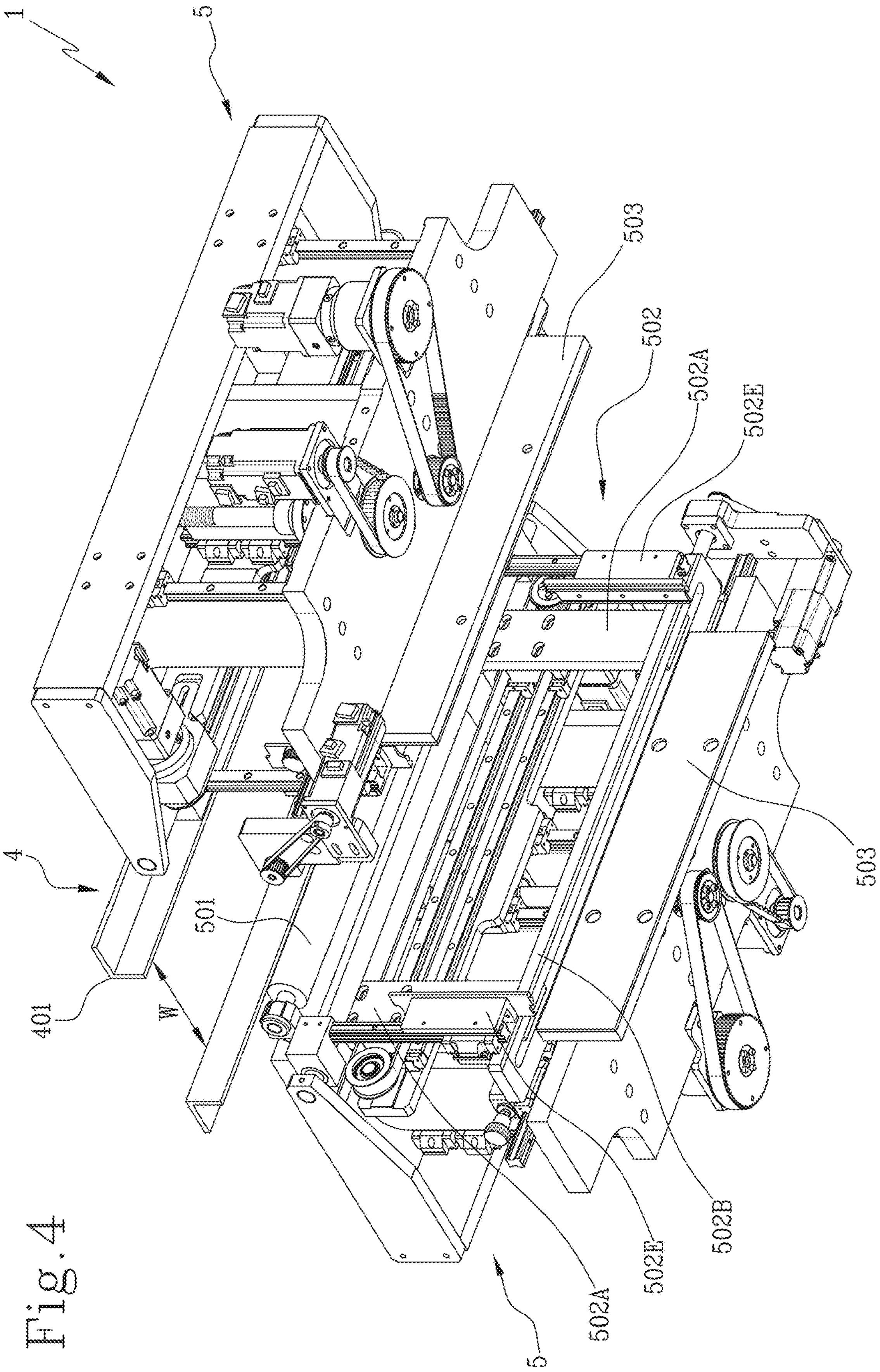
FIG. 4 shows the pair of folding heads in an axonometric view from a different angle.
Figure 5:
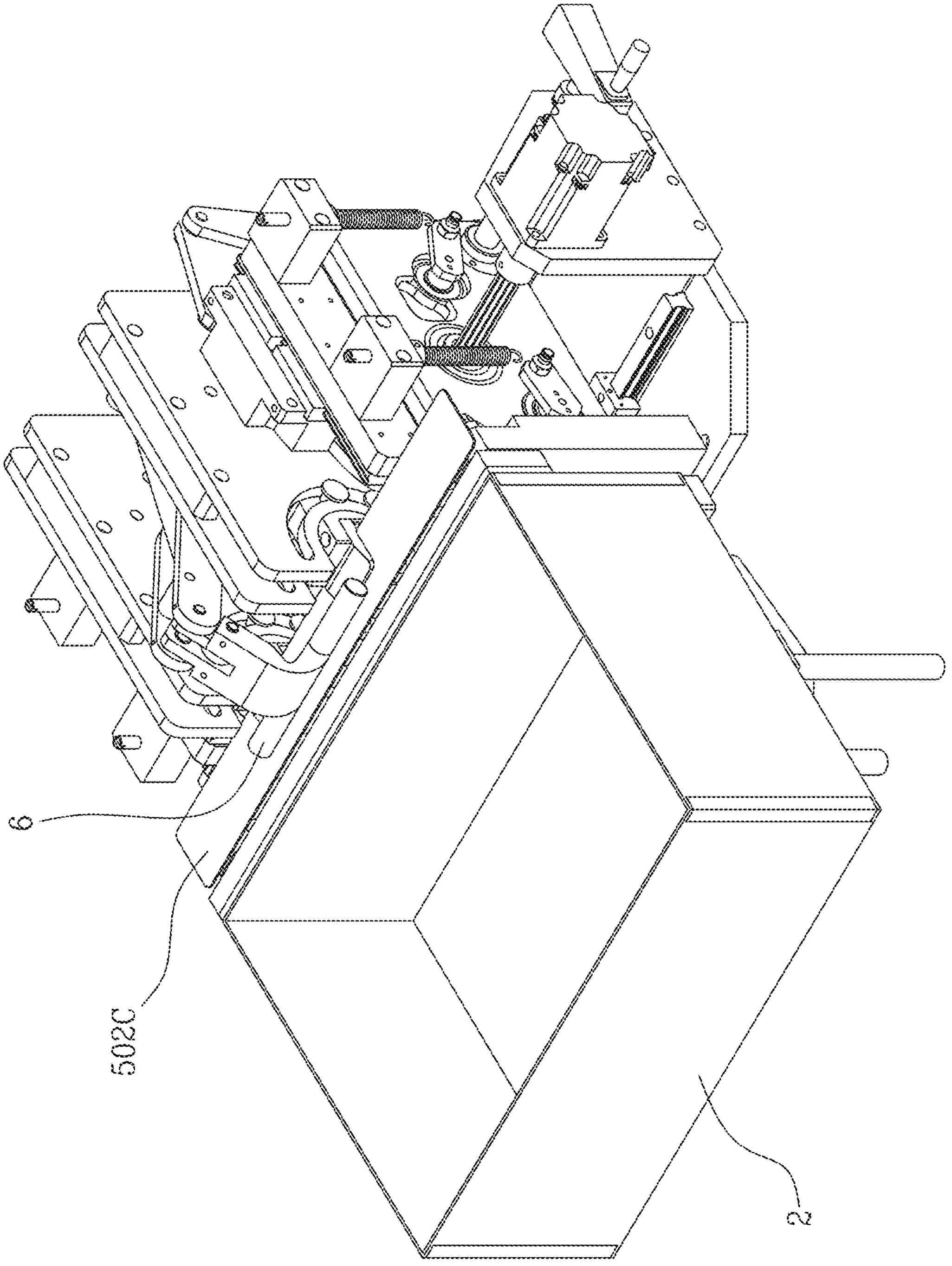
FIG. 5 shows a folding head provided with an arm and a rotating blade.
Figure 6:
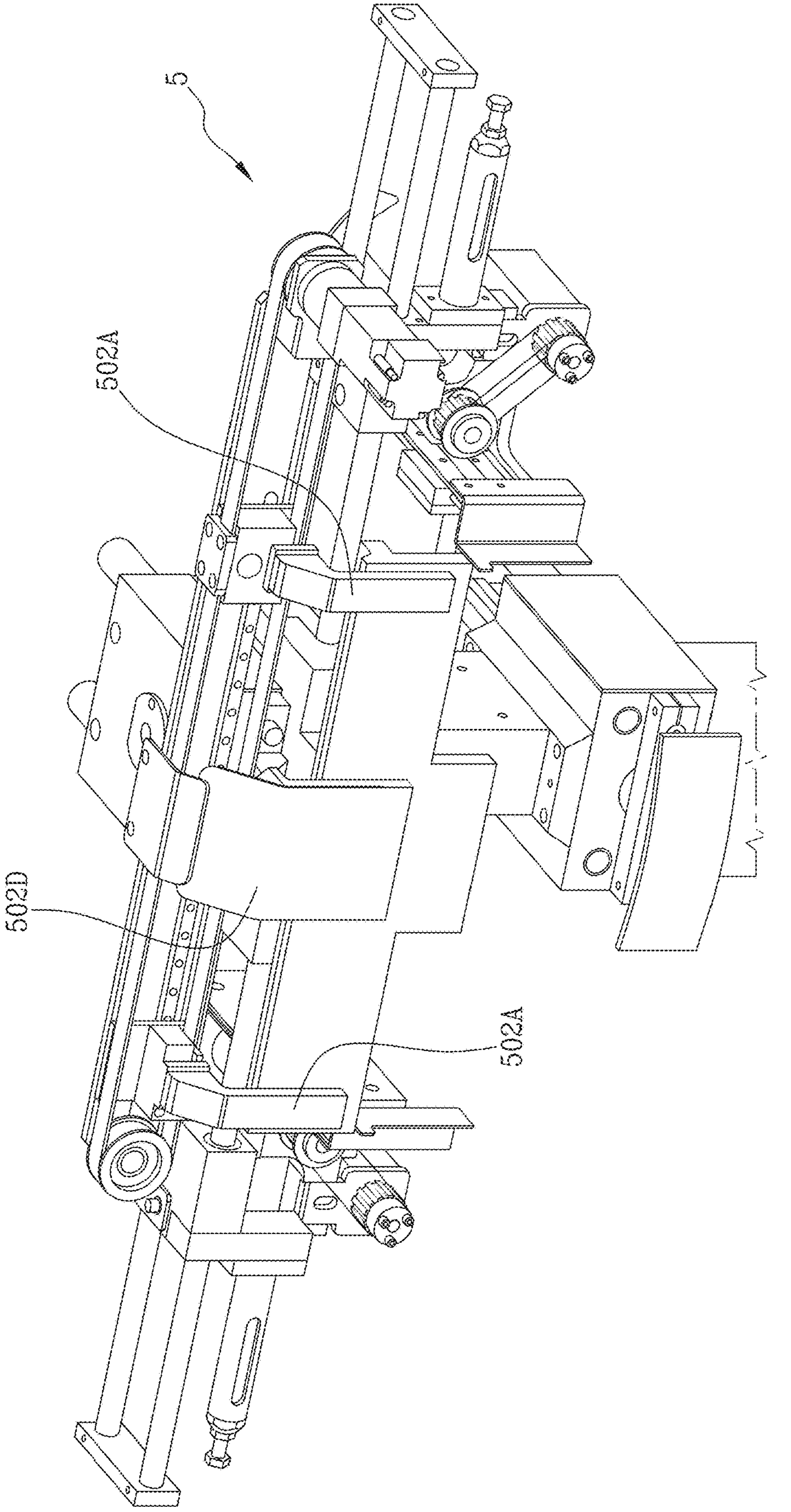
FIG. 6 shows a folding head without tilters.
Figure 7:
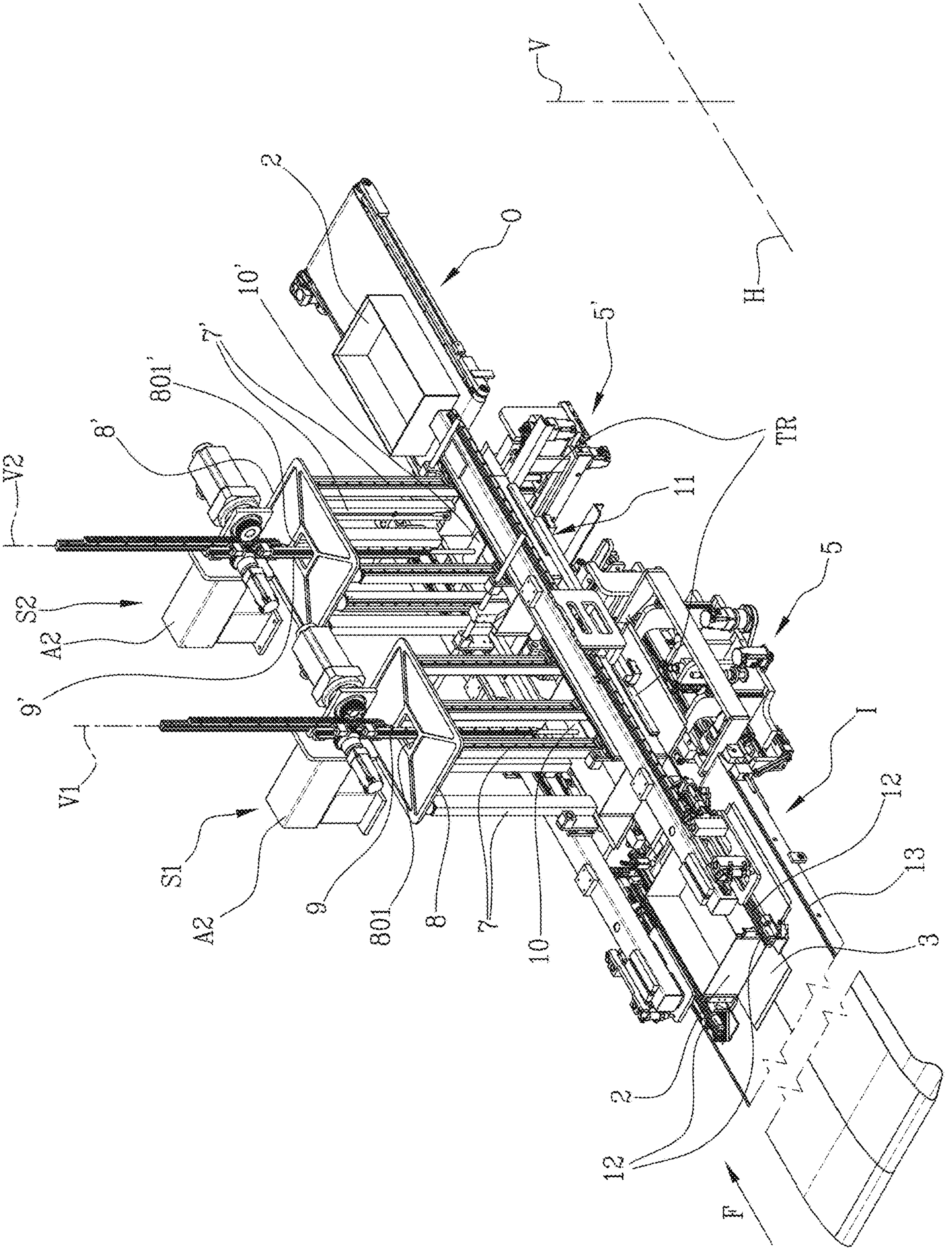
FIG. 7 shows the apparatus with two wrapping stations.
Figure 8:
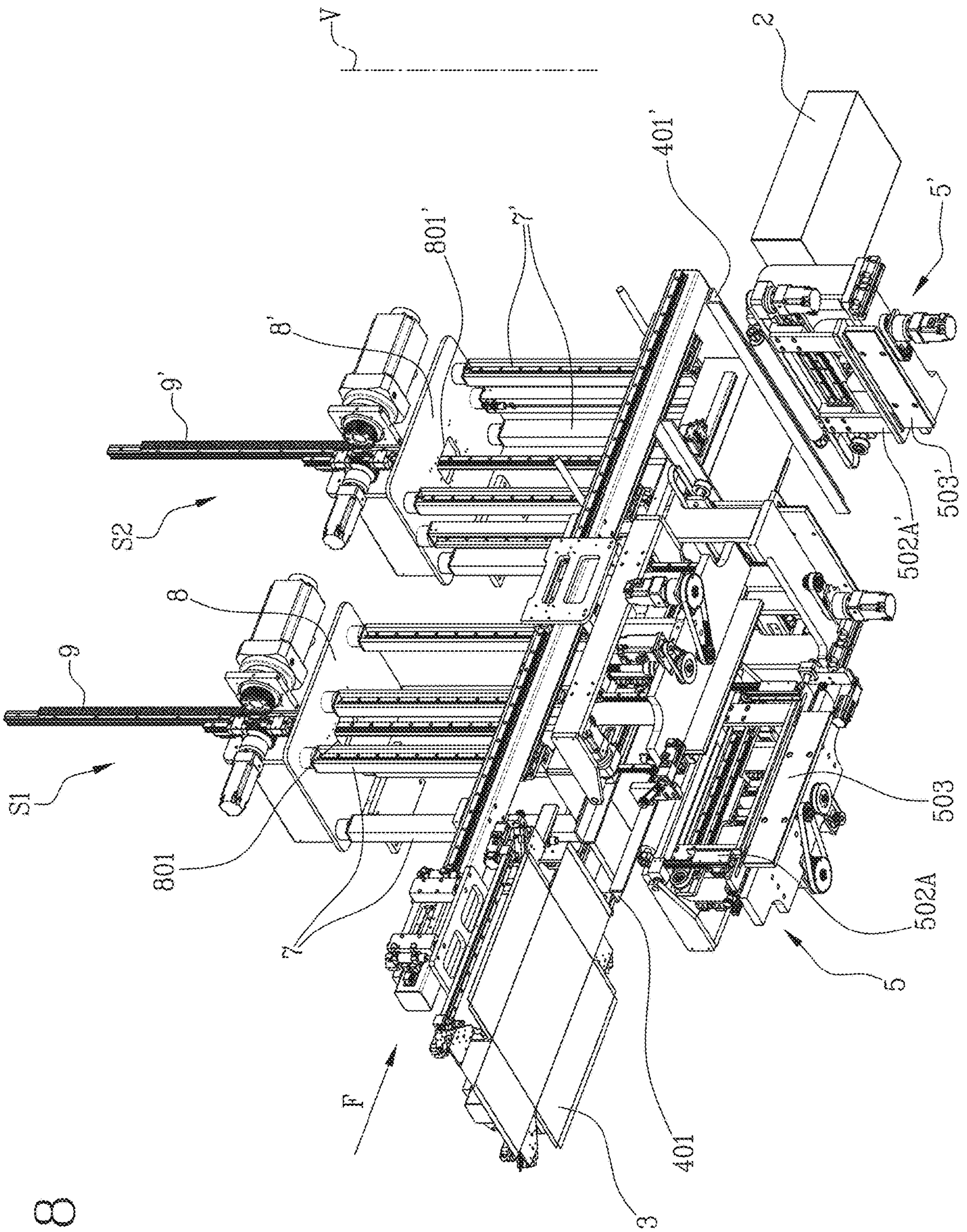
FIG. 8 shows the wrapping stations in an axonometric view from a different angle.
Figure 9:
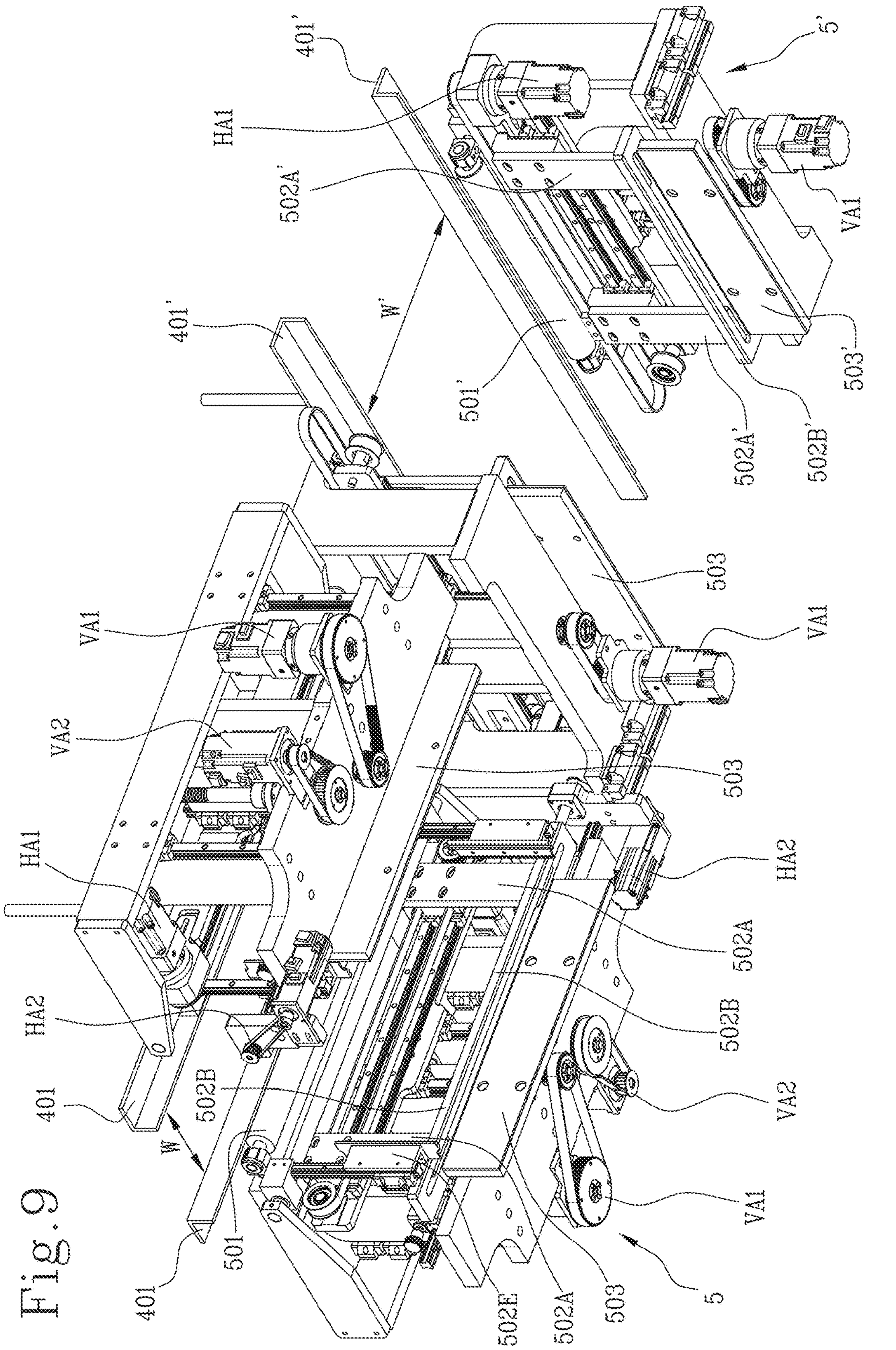
FIG. 9 shows the folding heads of the wrapping stations.
Figure 10:
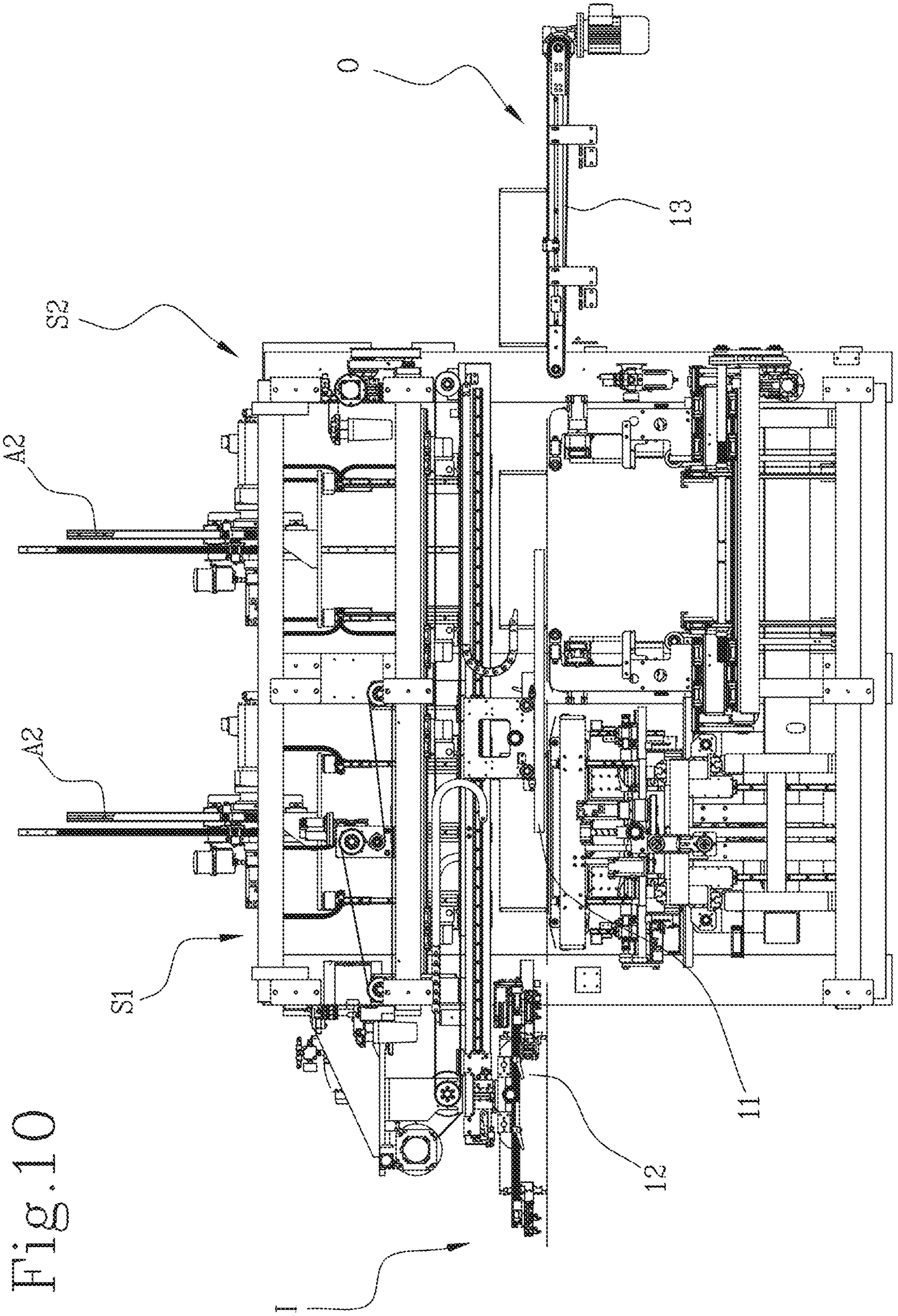
FIG. 10 is a side view of the two wrapping stations.
Figure 11:
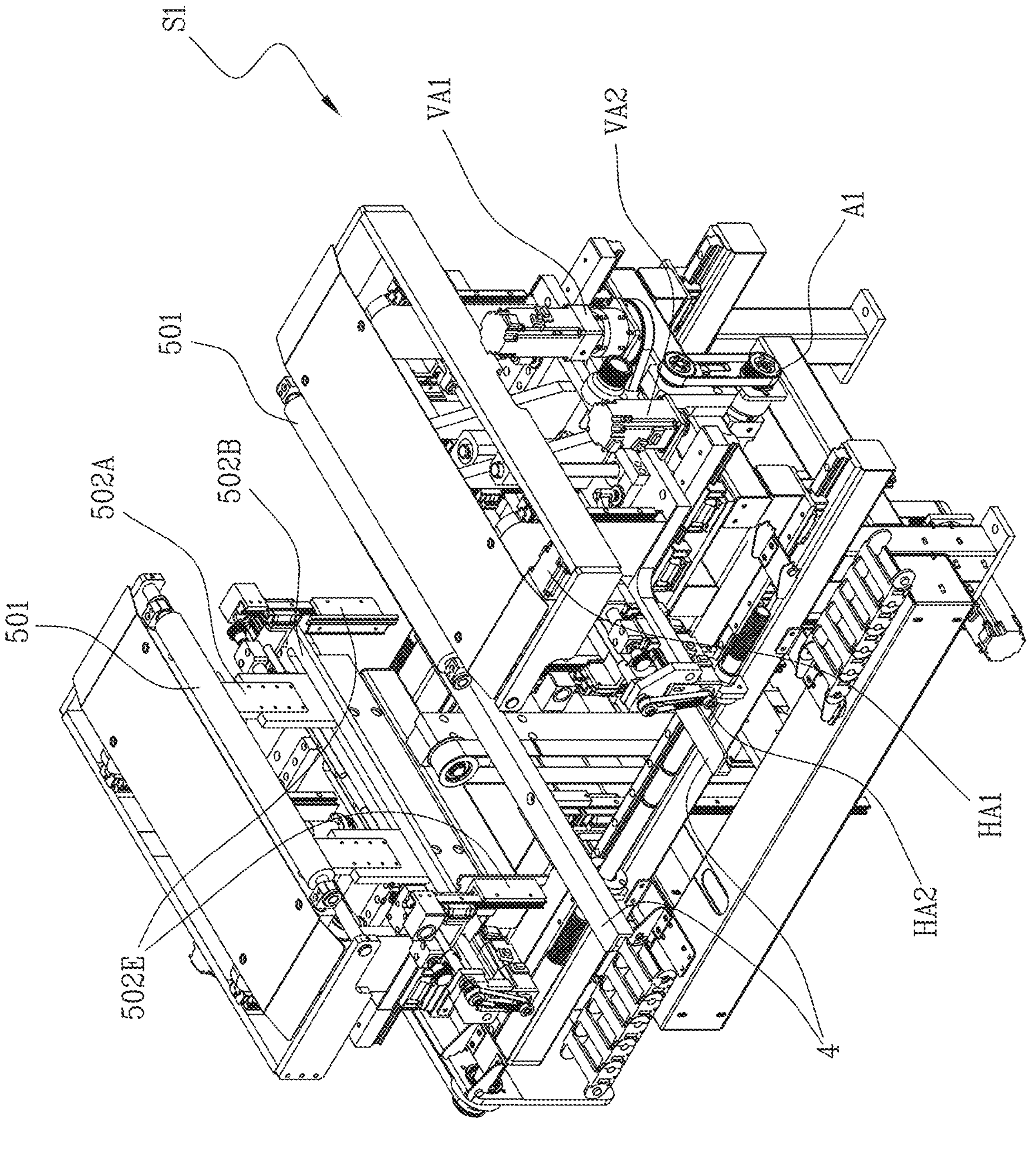
FIG. 11 shows the first wrapping station in an axonometric view according to a different angle.
Figure 12:
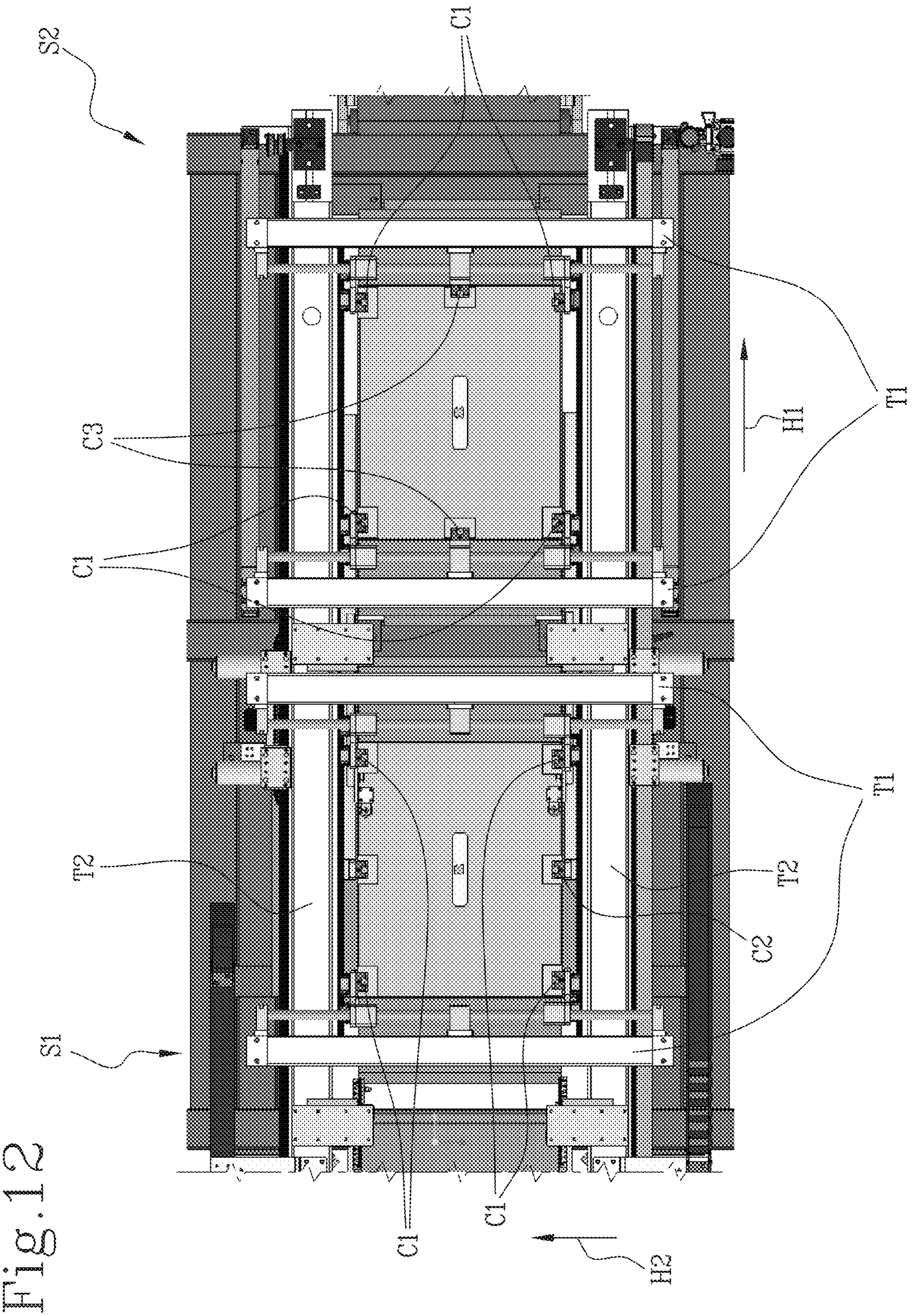
FIGS. 12-15 show columns in each of the wrapping stations.
Figure 13:
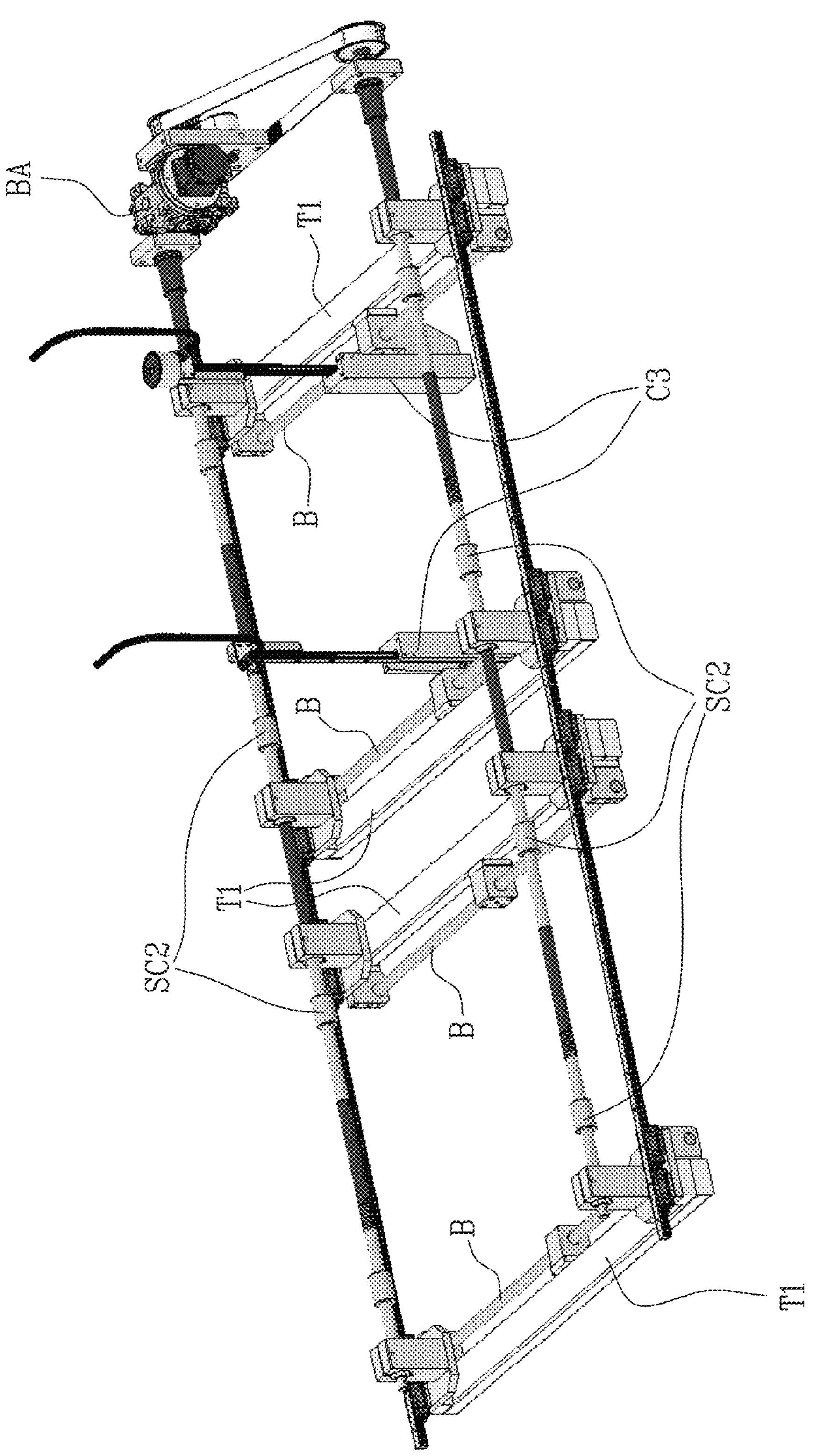
Figure 14:
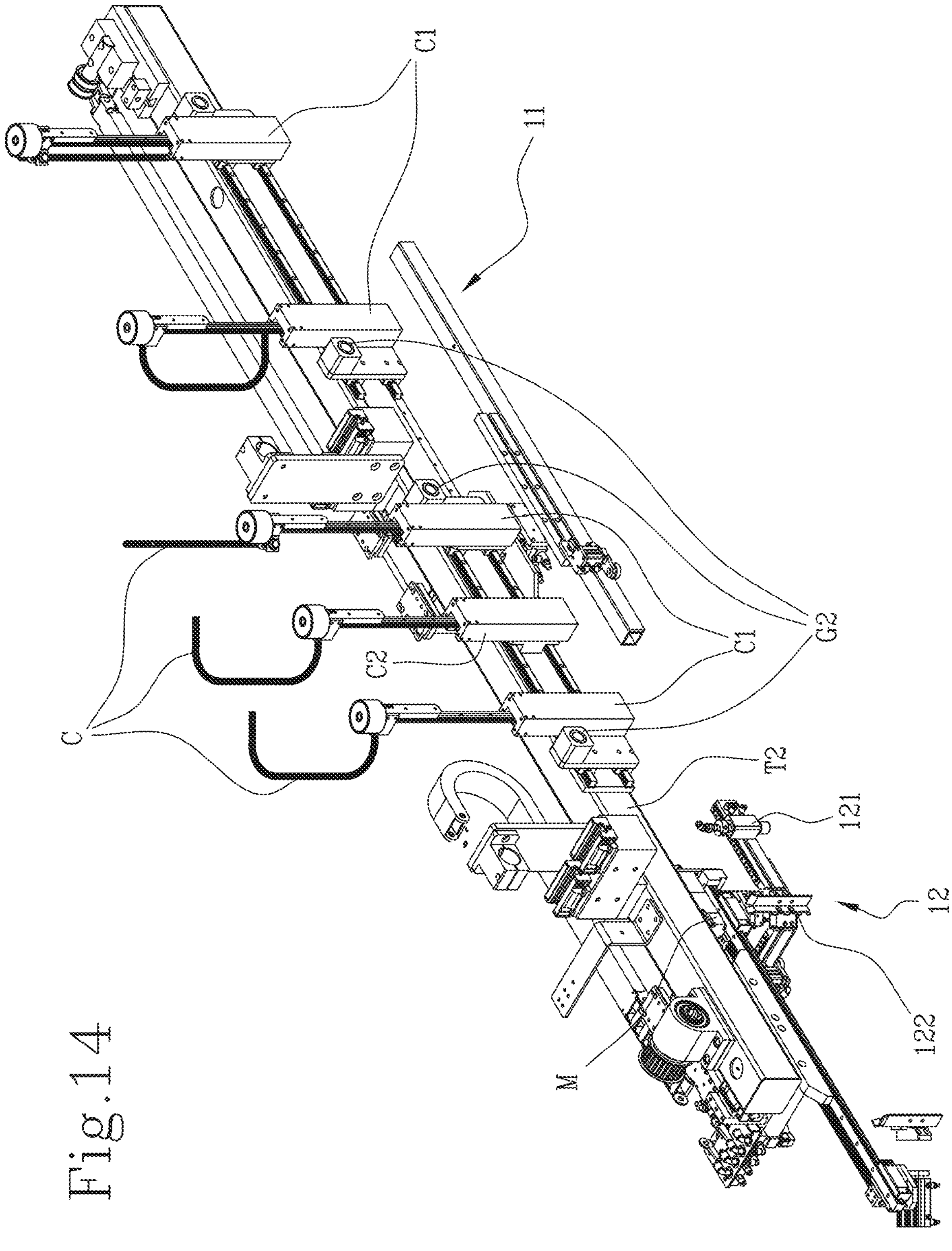
Figure 15:
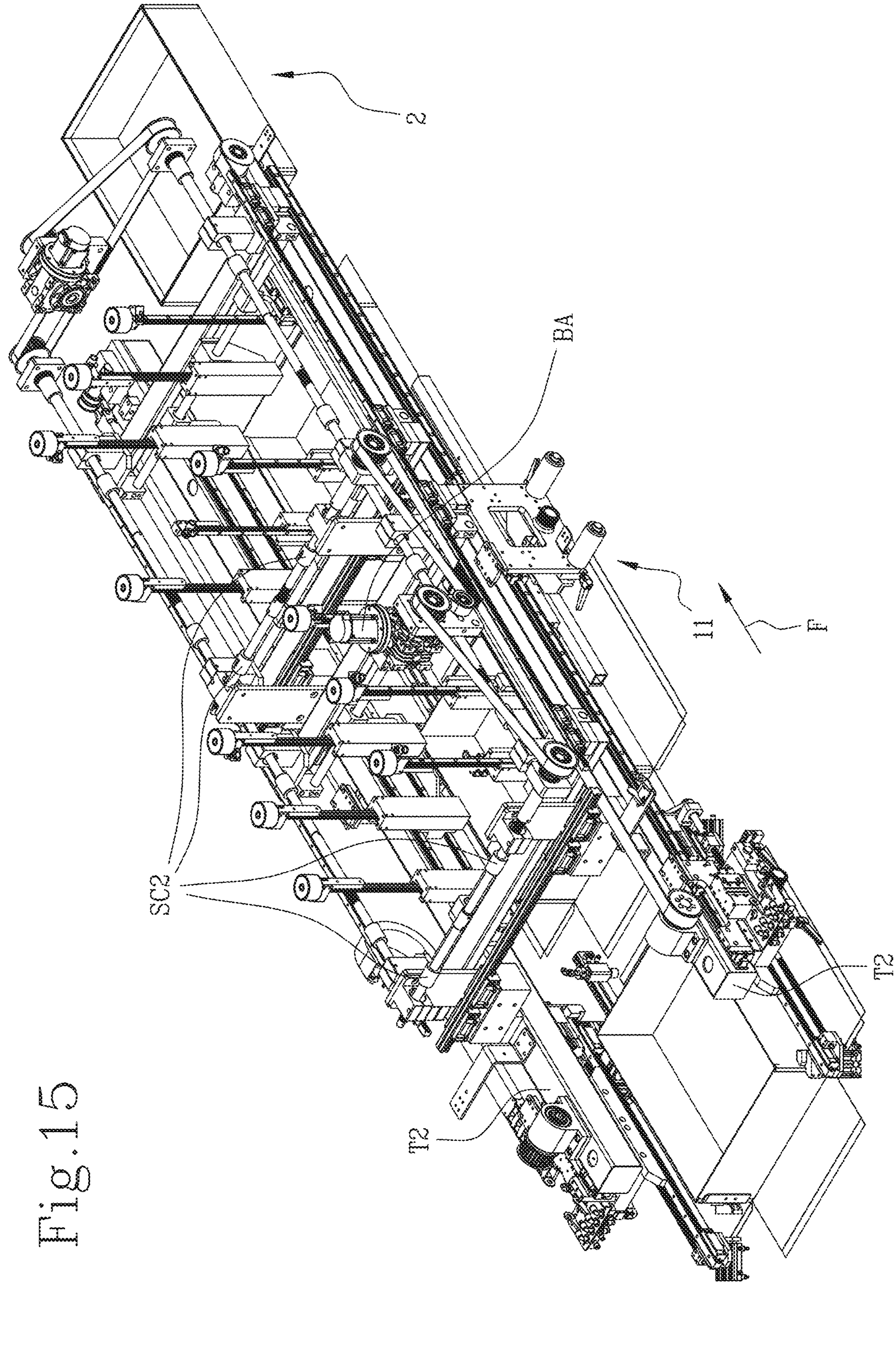
Figure 16:
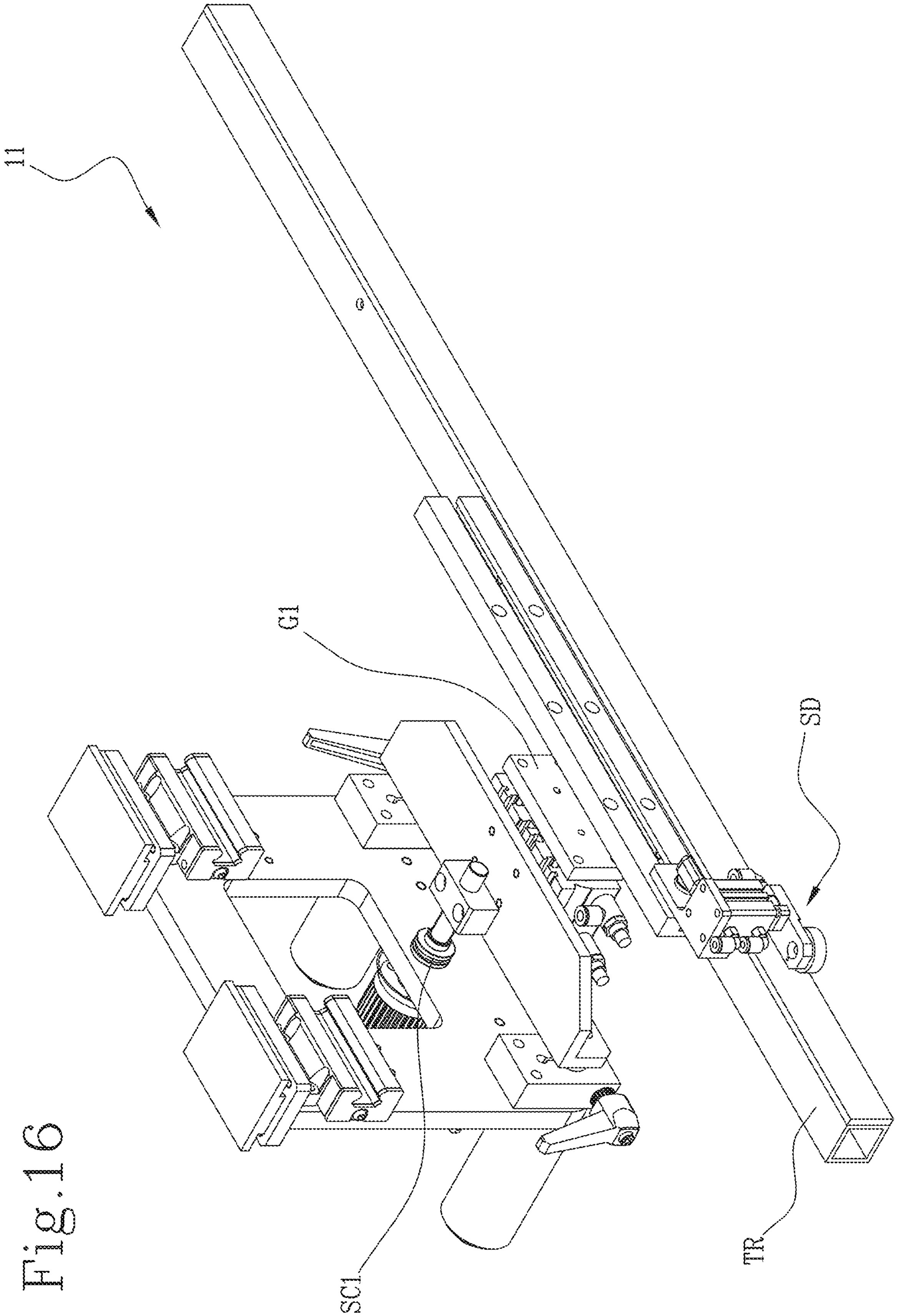
FIG. 16 illustrates a transport device.

With reference to the accompanying drawings, the numeral 1 denotes an apparatus for wrapping a box 2 with a wrapping blank 3. Preferably, the box 2 is made from cardboard, paperboard or the like. More specifically, by box 2 is meant a container comprising a plurality of lateral walls 202, 203, 204 and 205 and a bottom wall 201. The lateral walls 202, 203, 204 and 205 are interconnected by the bottom wall 201. The lateral walls 202, 203, 204, 205 (and the bottom wall 201) each have an internal face and an external face.

Further, the lateral walls 202, 203, 204, 205 each extend away from the bottom wall 201 from a lower, or connecting edge, to an upper, or free edge.

More specifically, the box illustrated has a pair of end walls 202, 203 (or short walls) and a pair of flanks 204, 205 (or long walls).

The blank 3 is made preferably of paper. The wrapping blank 3 has a base 301 and a plurality of flaps 302, 303, 304 and 305 connected thereto. The flaps of the plurality of flaps of the wrapping blank 3 are connected to each other and each can be confronted by, and coupled to, a respective wall 202, 203, 204 and 205 of the box 2. In this case, each flap wraps both faces (internal and external) of the lateral walls 202, 203, 204 and 205 of the box 2.

The wrapping blank 3 also comprises four side flaps 306, 307, 308 and 309. The side flaps 306, 307, 308 and 309 define a partial extension of two flaps 304 and 305 of the blank 3 in order to completely and uninterruptedly cover all four lateral walls 202, 203, 204 and 205.

Further, the flaps 302, 303, 304 and 305 are each made up of two portions: an inner portion 302*a*, 303*a*, 304*a* and 305*a*, adjacent to the base 301, and an outer portion 302*b*, 303*b*, 304*b* and 305*b*, spaced from the base 301 of the blank 3.

It should be noted that glue is spread on some parts of the blank 3 by a gluer apparatus 14 upstream of the apparatus 1. Alternatively, glue may be spread over the entire surface of the wrapping blank 3.

Before reaching the apparatus 1, the box 2 is received by a forming apparatus 15 and is placed on the pre-glued wrapping blank 3 in such a way that the bottom wall 201 of the box rests on the base 301 of the wrapping blank 3 (FIG. 1).

The forming apparatus 15, the conveyor belt 13, the gluer apparatus 14 and the wrapping apparatus 1 make up a line 100 for making wrapped boxes in continuous cycle from forming blanks 17 and wrapping blanks.

The line 100 also comprises a positioning device 16 that receives the boxes from the forming apparatus 15, couples them to corresponding wrapping blanks received from the gluer 14 (placing the base of the box on the base of the flat wrapping blank) and feeds them to the wrapping apparatus 1.

The apparatus 1 may comprise a support structure 4. The support structure 4 is configured to support the base 301 of the wrapping blank 3 and the box 2 coupled thereto. The support structure 4 may be configured to support the base 301 of the wrapping blank 3 at least at each vertex of the box 2. The support structure 4 may be movable along a vertical direction V. By vertical direction V is meant a direction parallel to the force of gravity. The support structure 4 may be configured to move the wrapping blank 3 and the box 2 coupled to it to different heights along the vertical direction V.

In an example embodiment, the apparatus 1 comprises a plurality of folding heads 5. The plurality of folding heads 5 is configured to fold the flaps 302, 303, 304 and 305 of the wrapping blank 3 from a horizontal position to a vertical position, so that the inner portion 302*a*, 303*a*, 304*a* and 305*a* of each flap 302, 303, 304 and 305 adheres to an external surface of the lateral wall 202, 203, 204 and 205 of the box 2 and the outer portion 302*b*, 303*b*, 304*b* and 305*b* of each flap protrudes vertically from the box 2. The plurality of folding heads 5 is also configured for folding the outer portions 302*b*, 303*b*, 304*b* and 305*b* of the flaps 302, 303, 304 and 305 from a vertical position to a horizontal position, and further to fold the outer portions 302*b*, 303*b*, 304*b* and 305*b* of the flaps towards the inside of the box 2 from the horizontal position to a vertical position so that they adhere to an internal surface of the lateral wall of the box 2.

In an example embodiment, the plurality of folding heads 5 includes pairs of folding heads. Preferably, for each pair of folding heads 5, the folding heads operate simultaneously on a respective pair of sides (or lateral walls 202, 203 and 204, 205) of the box 2.

Preferably, the folding heads 5 of each pair of folding heads are spaced from each other along a respective working direction W.

In an example embodiment, the support structure 4 comprises a plurality of pairs of supporting bars 401. The pairs of supporting bars 401 of the plurality of pairs of supporting bars may correspond to the pairs of folding heads of the plurality of pairs of folding heads 5. Preferably for each pair of supporting bars 401, the bars are oriented transversely to the working direction W of the respective pair of folding heads 5. The supporting bars 401 are movable towards and away from each other to support corresponding edges of a bottom wall of the box. The apparatus may also comprise a control unit. The control unit may be configured to receive input data. The input data preferably represent the size of each box 2 to be wrapped. The control unit is programmed to derive a setting for the apparatus 1, based on the input data. In this context, the supporting bars 401 are movable towards and away from each other, so that they are displaceable, responsive to the setting of the apparatus 1, to support corresponding edges of a bottom wall 201 of the box 2.

Alternatively, the support structure 4 may include a plate that supports the central part of the bottom wall 201 of the box 2 and the wrapping blank 3 coupled thereto.

The plurality of folding heads 5 may comprise a plurality of tilters 501, configured to fold the flaps 302, 303, 304, 305 of the wrapping blank 3 from the horizontal position to the vertical position, so that the inner portion 302*a*, 303*a*, 304*a*, 305*a* of each flap adheres to the external surface of the lateral wall 202, 203, 204, 205 of the box and the outer portion 302*b*, 303*b*, 304*b*, 305*b* of each flap protrudes vertically from the box 2. The tilters 501 may be movable in the vertical direction V relative to the support structure 4 to fold the flaps 302, 303, 304, 305 of the blank 3. In an example, the support structure 4 is stationary relative to the tilters 501 and the tilters 501 include an upward movement in the vertical direction V. The sliding contact between the tilters 501 and the flaps 302,302, 304 and 305 of the wrapping blank 3 occurs when the flaps of the wrapping blank 3 are folded from the horizontal position to the vertical position. Consequently, the inner portion 302*a*, 303*a*, 304*a*, 305*a* of each flap 302,302, 304 and 305, since it is pre-glued, adheres to the external surface of the lateral wall 202, 203, 204, 205 of the box 2 and the outer portion 302*b*, 303*b*, 304*b*, 305*b* of each flap protrudes vertically from the box 2. Alternatively, the support structure 4 includes a downward movement in the vertical direction, while the tilters 501 remain stationary.

The apparatus 1 may include an arm 6. The arm 6 is configured to act in conjunction with the folding heads 5 to prevent the box 2 from moving out of position while the flaps 302, 303, 304, 305 of the wrapping blank 3 are being folded. The arm 6 may have at least one rotational movement. The arm 6 is configured to move from an inactive position, where it is away from the lateral walls 202, 203, 204, 205 of the box 2, to an active position, where it is in contact with the internal face of the lateral wall of the box 2 to support the internal face of the lateral wall 202, 203, 204, 205 of the box. This configuration allows preventing the formation of creases inside the box 2, especially if the paper being used for the wrapping blank 3 is stiff. The plurality of folding heads 5 may include tucking devices 502 to fold the outer portions 302*b*, 303*b*, 304*b* and 305*b* of the flaps 302, 303, 304 and 305 from the vertical position to the horizontal position inside the box 2.

According to an aspect of this invention, the tucking devices 502 of the folding heads 5 each comprise a pair of fingers 502A. The fingers of the pair of fingers 502A may be movable along a first horizontal axis H1, towards and away from a corresponding lateral wall 202, 203, 204, 205 of the box 2. In an example, each of the folding heads 5 includes a first vertical movement actuator VA1 for moving the fingers 502A in the vertical direction V. Each of the folding heads 5 also includes a first longitudinal movement actuator HA1 for moving the fingers 502 A in the horizontal direction. H, approaching and moving away from a corresponding side wall of the box 2.

Preferably, each folding head 5 also comprises a horizontal blade 502B. The horizontal blade 502B is connected to an actuator A1 to move along a horizontal direction H orthogonal to the vertical direction V. The horizontal blade 502B is configured to move parallel with the bottom wall 201 of the box 2 and to move towards and away from a corresponding wall 202, 203, 204, 205 of the box 2. In other words, it allows folding the outer portions 302*b*, 303*b*, 304*b* and 305*b* of the flaps 302, 303, 304 and 305 from the vertical position to the horizontal position. Preferably, the horizontal blade 502B includes a through groove. In this solution, the respective pair of fingers 502A is operatively inserted inside the groove. Preferably, the fingers 502A and the blade 502B move simultaneously towards and away from the respective wall 202, 203, 204, 205 of the box 2.

Further, in an example embodiment, the support structure 4 and each pair of fingers 502A are also movable vertically relative to each other from a raised configuration, where the pair of fingers is located above the box 2, to a lowered configuration, where the pair of fingers 502A is located at least partly inside the box. In an example, the fingers 502A may perform a downward movement in the vertical direction V to fold the outer portions 302*b*, 303*b*, 304*b* and 305*b* of the flaps 302, 303, 304 and 305 inside the box 2. Alternatively, the support structure 4 and the box 2 may move upwards, while the opposing action between the fingers 502A and the outer portions of the flaps of the wrapping blank causes the flaps to be folded (that is to say, tucked) into the box 2. More specifically, the fingers of the pair of fingers 502A may be movable reciprocally towards and away from each other. Further, the pair of fingers 502A is preferably displaceable inside the box 2, so that the fingers 502A can be reciprocally moved in sliding contact with the wrapping blank 3 on the internal surface of the lateral wall 202, 203, 204, 205 of the box 2. The reciprocal movement of the fingers 502A of the pair of fingers is along a second horizontal axis H2. The second horizontal axis H2 is orthogonal to the first horizontal axis H1. In an example embodiment, the fingers 502A of the corresponding pair of fingers are movable reciprocally between a first position, where they are positioned at a reciprocal minimum distance, and a second position, where they are positioned at a reciprocal maximum distance. Preferably, the pair of fingers 502A is displaceable inside the box 2 with the fingers 502A at the first position. Preferably, each folding head 5 is configured to move the fingers 502A away from each other from the first position to the second position, with the pair of fingers 502A in the lowered configuration. That way, the fingers 502A move horizontally inside the box along the full length of the respective lateral wall 202, 203, 204, 205 of the box 2. Further, each folding head 5 is configured to move the fingers 502A from the second position to the first position as the fingers move towards each other, with the pair of fingers in the raised configuration. The apparatus may include a plurality of actuators. In an example, the plurality of actuators includes a sliding actuator. The sliding actuator, configured for moving the fingers 502A reciprocally towards and away from each other, between a first position, where they are positioned at a reciprocal minimum distance, and a second position, where they are positioned at a reciprocal maximum distance, and where the second position is set responsive to the setting of the apparatus 1. In an example embodiment, the tucking devices 502 may also comprise a plurality of hands 502E. The hands 502E are configured to fold the four side flaps 306, 307, 308 and 309 of the blank 3 so that they adhere to a portion of the internal face of the long lateral walls 204, 205 of the box 2. Preferably, the hands 502E are configured to be movable both horizontally and vertically so as to adapt to the size of the box to be wrapped. Each of the folding heads 5 includes a second vertical movement actuator VA2 for moving the hands 502E in the vertical direction V. The folding heads 5 also include a second longitudinal movement actuator HA2 for moving the hands 502E in the horizontal direction H.

In an example embodiment, the plurality of folding heads 5 includes a plurality of supporting plates 503. Preferably, the plurality of supporting plates 503 is parallel to the lateral walls 202, 203, 204, 205 of the box 2. The supporting plates 503 are configured to be movable from an operating position, where they are spaced from the lateral walls of the box 2, to a non-operating position, where they are in contact with the lateral walls of the box. In an example, at the operating position, the lateral walls 202, 203, 204, 205 of the box 2 are interposed and pressed between the supporting plates 503 and the fingers 502A.

According to an aspect of this disclosure, the tucking devices 502 may comprise a rotating blade 502C. In this case, the apparatus may be without the fingers 502A. The rotating blade 502C is configured to move horizontally, parallel to the bottom wall 201 of the box 2. Further, the rotating blade 502C is configured to rotate about an axis of rotation from a first position, where it is parallel to the bottom wall 201 of the box 2, to a second position, where it is orthogonal to the bottom wall of the box 2, so as to fold the outer portions 302*b*, 303*b*, 304*b*, 305*b* of the flaps from the horizontal position to the vertical position so they adhere to the internal surface of the lateral wall 202, 203, 204, 205 of the box 2.

According to another aspect of this disclosure, the folding heads 5 may be without tilters 501. In this solution, the tucking devices 502 include a stationary plate 502D. The stationary plate 502D is positioned between the fingers 502A of the pairs of fingers. In this solution, the stationary plate 502D may be configured to be movable together with the fingers along the vertical direction V relative to the box 2. The sliding contact between the stationary plate 502D and the inner portions 302*a*, 303*a*, 304*a*, 305*a* of the blank 3 while the box 2 is moving downwards (or the folding heads 5 are moving upwards) causes the flaps 302, 303, 304, 305 of the wrapping blank 3 to be folded from the horizontal position to the vertical position, so that the inner portion 302*a*, 303*a*, 304*a*, 305*a* of each flap adheres to the external surface of the lateral wall 202, 203, 204, 205 of the box 2 and the outer portion 302*b*, 303*b*, 304*b*, 305*b* of each flap protrudes vertically from the box 2.

In an example embodiment, the support structure 4 is adapted for moving along the vertical direction V between a first stop at a first height and a second stop at a second height lower than the first height.

Preferably, the folding heads 5 are configured to fold the flaps 302, 303, 304, 305 of the wrapping blank 3 from the horizontal position to the vertical position, with the support structure positioned at the first stop. The folding heads 5 are also configured for folding the outer portions 302*b*, 303*b*, 304*b*, 305*b* of the flaps from the vertical position to the horizontal position, and further from the horizontal position to the vertical position so that they adhere to an internal surface of the lateral wall 202, 203, 204, 205 of the box 2, with the support structure 4 located at the second stop.

According to an aspect of this disclosure, the apparatus 1 may comprise a plurality of columns 7. The plurality of columns 7 preferably extends along the vertical direction V. The columns may be movable horizontally and vertically relative to the folding heads 5. In an example embodiment, the columns 7 of the plurality of columns may be positioned inside the box 2 on the internal face of the bottom wall 201 of the box, at least at every vertex of the box 2, so that the bottom wall 201 of the box is operatively interposed between the plurality of columns 7 and the support structure 4. In particular, the columns are movable towards and away from each other along the horizontal direction H. The columns are movable horizontally with respect to the folding heads, so that they can be positioned inside the box on the internal face of the bottom wall of the box.

In an example, the apparatus also comprises a horizontal tray 8. The horizontal tray 8 is preferably positioned above the support structure 4 and parallel thereto. The horizontal tray 8 may be movable vertically. In an example, the plurality of columns 7 is operatively connected to the tray 8. Therefore, the horizontal tray 8 may be movable along the vertical direction V together with the columns 7. The plate and the columns can be moved by means of an actuator A2. The apparatus 1 can include a container C to contain connection wires of the columns 7. Connection wires are used for movement of the columns.

In an example, the control unit may be configured to move the columns 7 horizontally, responsive to the setting of the apparatus 1.

Furthermore, in an example, the apparatus 1 may comprise a wrapping configuration in which the plurality of columns 7 is fixed to the tray 8 to move along the vertical direction V.

The apparatus may also comprise a setting configuration in which the plurality of columns 7 is movable horizontally relative to the tray 8 so that the columns 7 can be displaced horizontally responsive to the setting of the apparatus. In particular, in the setting configuration, the columns of the plurality of columns 7 are mutually movable along the horizontal direction H, according to the setting of the apparatus, to move close or away from each other, so that at least each vertex of the box 2 to be wrapped is supported by a column of the plurality of columns 7.

The tray 8 may also be provided with a central, through hole 801. The apparatus 1 may comprise a rod 9. In an example, the rod 9 is movable along the vertical direction V. The rod 9 may be inserted into the central through hole 801 in the tray 8.

In an example embodiment, a disk 10 is connected to a lower end of the rod 9. The disk 10 is configured to contact a central portion of the internal face of the bottom wall 201 of the box 2.

Preferably, the tray 8 is movable vertically independently of a vertical movement of the rod 9.

More specifically, the plurality of columns 7 is configured for being in contact with the internal face of the bottom wall 201 of the box 2, in an active position. In an example embodiment, the columns 7, in the active position, are configured for acting in conjunction with the support structure 4 to press the bottom wall 201 of the box 2 interposed between them. In the active position, the plurality of columns 7 is configured to remain in contact with the bottom wall 201 of the box and to press it at each vertex of the box 2 along the edges of the bottom wall 201 of the box 2 supported by the support structure 4.

The plurality of columns 7 is also configured for being spaced from the internal face of the box 2, in an inactive position. In an example, the disk 10 is configured to contact a central portion of the internal face of the bottom wall 201 of the box 2 when the columns 7 are spaced from the box 2 in the inactive position. In an example, the columns 7, the tray 8 and the disk 10 (together with the rod 9) are configured to move down into the box 2 when the box and the blank 3 are at an initial height where they are received by the apparatus 1. The columns 7, the tray 8 and the disk 10 may be configured to remain in contact with the internal face of the bottom wall 201 of the box 2 during the relative movement between the support structure 4 and the tilters 501 to fold the flaps 302, 302, 304, 305 of the wrapping blank from the horizontal position to the vertical position. Preferably, the columns 7 are configured to be spaced from the box 2 after the inner portions 302*a*, 303*a*, 304*a*, 305*a* of the flaps of the blank 3 have been folded so that the tucking devices 502 can interact with the box 2 to fold the outer portions of the flaps of the blank. The disk 10 is configured to remain in contact with the box and to support the internal face of the bottom wall 201 of the box 2. The rod 9, together with the disk 10 and the support structure 4 may perform an upward movement to bring the wrapped box 2 to the initial height.

According to another aspect of this disclosure, the apparatus 1 may comprise an infeed I. The infeed I is configured to receive the box 2 and the wrapping blank 3 coupled thereto along an advancing direction F. The apparatus 1 may also comprise an outfeed O to release the box 2 when it has been wrapped. In an example embodiment, the apparatus 1 comprises a first wrapping station S1 and a second wrapping station S2. The first wrapping station S1 may comprise a first subset of the plurality of folding heads 5. The second wrapping station S2 may comprise a second subset of the plurality of folding heads 5'. Preferably, the first and the second wrapping station are spaced from each other along a horizontal direction H, orthogonal to a vertical direction V. The first and the second wrapping station may each comprise a respective support structure 4, 4' according to this disclosure. In an example embodiment, the apparatus 1 also comprises a transport device 11. The transport device may be movable relative to each of the support structures 4, 4' in order to transport the box 2 and the wrapping blank coupled thereto along the advancing direction F.

In an example embodiment, the first wrapping station S1 is located upstream of the second wrapping station S2 relative to an advancing path of the box from the infeed I to the outfeed O. Preferably, the transport device 11 is configured to transport the box 2 and the wrapping blank coupled thereto from the first wrapping station to the second wrapping station. In an example, the transport device 11 is configured to transport the box 2 and the wrapping blank 3 coupled thereto from the first wrapping station S1 to the second wrapping station S2 by moving the box in translation along the horizontal direction H, without rotating the box 2, in such a way that the advancing path is aligned with the advancing direction F of the box at the infeed. Preferably, the transport device 11 is configured to grab two consecutive boxes of a succession of boxes simultaneously and to move them along the advancing path. The plurality of actuators may comprise an actuator A3 for moving the transport device 11. More specifically, the control unit may be programmed to move the transport device 11 relative to the advancing path from the infeed I to the outfeed O. The control unit may be programmed to move the transport device 11 forward, in the advancing direction F, from a first position to a second position, forward further from the second position to a third position and backwards in the direction opposite to the advancing direction F from the third position to the first position. The transport device 11, at the first position, is configured to grab one box at the infeed I and one box in the first wrapping station S1. In an example, the transport device 11, at the second position, is configured to grab one box in the first wrapping station S1 and one box in the second wrapping station S2. The transport device 11, at the third position, is configured to grab one box in the second wrapping station S2 and in the outfeed of the apparatus 1. The transport device 11 is movable along the horizontal direction H. In an example, the transport device 11 is movable along the advancing direction F, between the first wrapping station S1 and the second wrapping station S2.

According to an embodiment, the transport device 11 includes a pair of transport rods TR. The transport rods are oriented along the advancing direction F. The transport rods are spaced from each other along a transverse direction, parallel to the horizontal direction H and orthogonal to the advancing direction F. In an example, the transport rods TR are configured to hold 2 boxes together. The pair of transport rods TR is configured to hold the lateral walls 204, 205 of the boxes. Furthermore, the pairs of transport rods 11 are movable towards and away from each other to adapt to the dimensions of the box to be wrapped. In particular, the pair of transport rods TR can move towards and away from each other along the transverse direction, to grasp and release the boxes. The pair of transport rods TR is movable along the advancing direction F, to move the boxes along the advancing direction.

In an example, the transport rods TR are configured to take two consecutive boxes at the same time. In an example, the transport device 11 is configured to transport the boxes from the first wrapping station S1 to the second wrapping station S2 and from the second wrapping station S2 to the outfeed O of the apparatus. In particular, the transport rods can be configured to move between a first position in which the transport rods take a first box in the first wrapping station S1 and a second box in the second wrapping station, and a second position, spaced from the first position along the advancing direction, in which the transport rods take the first box in the second wrapping station and the second box in the outfeed of the apparatus 1. Furthermore, the transport device 11 can include a suction device SD for lifting the front flap 302 of the wrapping blank 3 coupled to the box 2. In one example, the suction device is placed downstream of the first wrapping station S1. The suction device lifts the front flap 302 of the wrapping blank 3 coupled to the box 2 during the transport of the box from the first wrapping station S1 to the second wrapping station S2. In one example, the suction device is placed between the first and the second wrapping station. The suction device is movable along the advancing direction F. In one example, the suction device includes at least one suction cup. In one example, the suction cup is coupled to a respective transport rod TR. The position of the suction cup along the feed direction F is adjusted by means of a guide G1. In addition, the initial position of the TR transport rods to hold each box 2 is adjusted via the actuator A3 and an adjustment screw SC1.

It should be noted that the support structures 4, 4' and the first and the second subset of the plurality of folding heads 5, 5' are according to this disclosure.

Therefore, the support structures 4, 4' may each comprise a plurality of supporting bars 401, corresponding to the plurality of folding heads 5, 5'. Preferably, the supporting bars are movable towards and away from each other so they can be displaced to support corresponding edges of the bottom wall 201 of the box 2. Further, the support structures 4, 4' may be configured to movably support the base 301 of the wrapping blank 3 and the box 2 coupled thereto so that the blank and the box coupled thereto are movable, in the first and in the second wrapping station S1, S2, along a first vertical axis V1 and a second vertical axis V2, respectively. The first and the second vertical axis are spaced from each other horizontally. In an example, each wrapping station may have a first height and a second height, lower than the first height. Preferably, the transport device 11 is configured to grab the box 2 positioned at the first height. In an example embodiment, in each wrapping station, the support structure 4, 4' is configured to perform a downward movement to move the box from the first height to the second height. In each wrapping station, the support structure 4, 4' may also configured to perform an upward movement to move the box 2 from the second height to the first height.

In an example embodiment, the apparatus comprises, in each of the stations, a plurality of columns 7' (according to one or more of the aspects of this disclosure).

Preferably, the plurality of columns 7 comprises a first group of columns 7 and a second group of columns 7'. In an example, the first and the second wrapping station S1, S2 comprise the first and the second group of columns, respectively. In each wrapping station, the plurality of columns is oriented orthogonally to the working direction W, W' of a respective pair of folding heads 5, 5'.

The columns 7, 7' may be movable both horizontally and vertically. In an example, the columns are in contact with the internal face of the bottom wall 201 of the box 2 at least at every vertex of the box 2, so that the bottom wall 201 of the box is interposed between the support structure 4, 4' and the plurality of columns 7, 7' at least at every vertex of the box. In particular, in the first and second group of columns 7, 7', the columns are movable towards and away from each other so that in each wrapping station, the columns of the plurality of columns 7, 7' are positioned at least in each vertex of the box 2 on the lateral walls 202, 203 or 204, 205 of the box to be wrapped. In an example, the first and second group of columns 7, 7' include a plurality of vertex columns C1 to support each vertex of the box 2, and a plurality of central columns C2, C3 to support the internal surface of the lateral walls of the box. each central column of the plurality of central columns C2, C3 is positioned between two vertex columns C1. In an example, in the first wrapping station S1, in the setting configuration, a vertex column C1 is positioned in a respective vertex of the box. Furthermore, a central column C2 is positioned between each two vertex columns C1, on the long sides of the box 2 to support the lateral walls 204, 205 of the box 2, in a central position of the lateral walls 204, 205 of the box 2. Furthermore, in the second wrapping station S2, a vertex column C1 is positioned in a respective vertex of the box. Furthermore, a central column C3 is positioned between each two vertex columns C1, on the short sides of the box 2 to support the lateral walls 202, 203 of the box 2, in a central position of the side walls 202, 203 of the box 2. Therefore, in an example, the first group of columns 7 are arranged along the first horizontal axis H1 to support the long sides of the box and the second group of columns 7' are arranged along the second horizontal axis H2 to support the short side of the box.

In one example, each wrapping station S1, S2 includes a pair of longitudinal crossbars T1. The longitudinal crossbars of each pair of longitudinal crossbars T1 are spaced from each other. The longitudinal crossbars extend longitudinally. The longitudinal crossbars extend along the second horizontal axis H2. The longitudinal cross bars T1 are mutually movable in towards and away from each other. The longitudinal crossbeams are movable along the first horizontal axis H1. In particular, the position of the longitudinal crossbars T1 is adjusted by means of an actuator BA and a plurality of adjustment screws SC2. In one example, the columns slide along the longitudinal crosspieces T1. In particular, the vertex columns slide along the longitudinal crossbars T1. Furthermore, each wrapping station S1, S2 can include a pair of longitudinal rods B. Each longitudinal rod of each pair of longitudinal rods is integral with a respective longitudinal crossbar T1. The longitudinal rods B are extended along the second horizontal axis H2. In one example, the vertex columns C1 are coupled to the longitudinal rods B. In addition, the vertex columns slide on the longitudinal rods along the second horizontal axis H2, in response to the setting of the apparatus. In particular, the vertex columns C1 are moved along the longitudinal rods B by means of movement guides G2. The apparatus 1 also includes a pair of transverse crossbars T2. The crossbars are spaced apart and extended transversely. The transverse crossbars extend along the first horizontal axis H1. The transverse crossbars T2 are placed orthogonally to the pairs of longitudinal crossbars T1. The transverse crossbars are mutually movable in towards and away from each other. The transverse crossbars are movable along the second horizontal axis H2. In one example, the plurality of columns is also movable by means of the transverse crossbars. In particular, in one example, the central columns C2 of the first wrapping station S1 are coupled to the transverse crossbars T2. Furthermore, the central columns C3 of the second group of columns 7' of the second wrapping station S2 are coupled to the longitudinal crossbars T1.

In one example, the apparatus includes an adjustment system for format change. The adjustment system for format change is connected to the plurality of columns 7. The adjustment system for format change is configured to move the columns horizontally towards and away from each other to adapt them to the type of box to be wrapped (i.e. to the size of the box). In one example, the adjustment system for format change includes the longitudinal crossbars and the transversal crossbars. Therefore, in one example, the adjustment system for format change moves the columns by means of the longitudinal crossbars T1 and/or the transverse crossbars T2.

In an example, the vertex columns C1 of the first and second wrapping station are movable along the second horizontal axis H2 by means of the longitudinal rods B and are movable along the first horizontal axis H1 by means of the reciprocal movement of the longitudinal crossbars T1 towards and away from each other. Furthermore, the central columns C2 of the first wrapping station are movable along the second horizontal axis H2 through the reciprocal movement of the transversal crossbar T2 towards and away from each other and the central columns C3 of the second wrapping station S2 are movable along the first longitudinal axis H1 through the reciprocal movement of the longitudinal crossbars T1 towards and away from each other. Note that each central column, C2, C3 is equidistant from two vertex columns C1 between which the central column C2, C3 is placed.

In an example, the central columns C2 of the first wrapping station S1 are arranged rotated by 90 degrees with respect to the central columns C3 of the second wrapping station S2 and the supporting bars 401 of the first wrapping station S1 are arranged rotated by 90 degrees with respect to the supporting bars 401' of the second wrapping station S2. In one example, each of the first and second wrapping stations includes the adjustment system for format change. In addition, the adjustment system for format change is also connected to the supporting bars. In an example, the adjustment system for format change, in each wrapping station S1, S2, moves the columns 7, 7' and the respective supporting bars 4, 4' in a coordinated way, so that for each box to be wrapped, the columns and respective supporting bars move simultaneously, in response to the setting of the apparatus, so that, for each box, at least in each vertex of the box, the bottom wall of the box is operationally interposed between the plurality of columns and the supporting bars.

In particular, the adjustment system for format change moves the columns and supporting bars so that for each box, the vertices of the box are supported by the vertex columns C1 and a central part of the lateral walls 203,203,204,205 is supported by the central column C2, C3 and that the bottom wall 201 of the box is operatively interposed between the plurality of columns 7, 7' and the support bars 401, 401'.

Note that the present invention also provides an embodiment in which the apparatus includes a single wrapping station, provided with the plurality of columns. In this embodiment example, the columns of the plurality of columns can be moved by means of the adjustment system for format change and in particular by means of the longitudinal crossbars T1 and/or the transverse crossbars T2. Furthermore, in the example of embodiment in which a single wrapping station is provided, the adjustment system for format change can move the columns and respective support bars according to the solution described for the embodiment in which two wrapping stations are provided.

In an example, the plurality of tilters 501, 501' of the folding heads 5, 5' in each wrapping station and the plurality of columns 7, 7' are configured to act in conjunction to fold the flaps 302, 303, 304, 305 of the blank 3 from the horizontal position to the vertical position.

In an example embodiment, the first wrapping station S1 includes a first pair of tilters 501 according to this disclosure. The first wrapping station S1 also includes a first pair of tucking devices 502 according to this disclosure.

The second wrapping station S2 includes a second pair of tilters 501' according to this disclosure and a second pair of tucking devices 502' according to this disclosure. The first pair of tilters 501 may be disposed at 90 degrees to the second pair of tilters 501'. The first pair of tucking devices 502 may be disposed at 90 degrees to the second pair of tucking devices 502'. Thus, the first station is configured to wrap one pair of lateral walls of the box 2, for example, long walls 204, 205. The second wrapping station S2 may be configured to wrap another pair of lateral walls of the box 2, for example, short walls 202, 203.

In an example embodiment, in each of the wrapping stations S1, S2, the pair of tucking devices 502', 502' is spaced from the pair of tilters 501, 501' along the vertical direction V. In this solution, the support structure 4, 4' in each wrapping station S1, S2 is preferably configured to act in conjunction with the tilters 501, 501' to fold a pair of flaps 302, 303, 304, 305 from the horizontal position to the vertical position so that each of the outer portions 302*b*, 303*b*, 304*b* 305*b* of the flaps protrudes vertically from the box 2 at the first height. The support structure is also configured to act in conjunction with the tucking devices 502, 502' to fold the outer portions 302*b*, 303*b*, 304*b*, 305*b* of the pair of flaps towards the inside of the box at the second height.

In another example embodiment (not illustrated), the first wrapping station S1 comprises two pair of tilters 501, 501', and the second wrapping station S2 comprises two pairs of tucking devices 502, 502'. In other words, the first station may be configured to fold the flaps 302, 303, 304, 305 from the horizontal position to the vertical position so that the outer portion 302*b*, 303*b*, 304*b*, 305*b* of each flap protrudes vertically from the box 2. The second station may be configured to receive the box 2 with the inner portions 302*a*, 303*a*, 304*a*, 305*a* of each flap 302, 303, 304, 305 attached to the external surface of the lateral walls 202, 203, 204, 205 of the box 2 and the outer portions 302*b*, 303*b*, 304*b*, 305*b* of each flap protruding vertically from the box 2. The second station is also configured to fold the outer portions 302*b*, 303*b*, 304*b*, 305*b* of each flap towards the inside of the box so that they adhere to the internal surfaces of the lateral walls 202, 203, 204, 205 of the box 2. Furthermore, in the first wrapping station S1, the pairs of tilters 501.501' are spaced from each other along the vertical direction V and in the second wrapping station S2, the pairs of tucking devices 502.502' are spaced from each other along the vertical direction V.

In an example embodiment, the pairs of brushes of the first station comprise a first pair 501 and a second pair 501' of tilters and the pairs of tucking devices of the second station comprise a first pair 502 and a second pair 502' of tucking devices. In the first wrapping station S1, the first pair of tilters 501 is disposed at 90 degrees to the second pair of tilters 501'. Further, in the second wrapping station, the first pair of tucking devices 502 is disposed at 90 degrees to the second pair of tucking devices 502'. Further, in the first wrapping station, the first pair of tilters 501 is spaced from the second pair of tilters 501' along the vertical direction V. In the second wrapping station, the first pair of tucking devices 502 is spaced from the second pair of tucking devices 502' along the vertical direction V. In this solution, the support structure 4, in the first wrapping station S1, is preferably configured to act in conjunction with the first pair of tilters 501 to fold one pair of flaps—for example, the flaps 304, 305—from the horizontal position to the vertical position at the first height and to act in conjunction with the second pair of flaps 501' to fold another pair of flaps—for example, the flaps 302, 303—from the horizontal position to the vertical position at the second height. In the second station S2, the support structure 4' is configured to act in conjunction with the first pair of tucking devices 502 to fold the outer portions of one pair of flaps—for example, the portions 304*b*, 305*b*—into the box at the first height and to act in conjunction with the second pair of tucking devices 502' to fold the outer portions of another pair of flaps—for example, the portions 302*b*, 303*b*—into the box at the second height. The second height is lower than the first height.

In another embodiment, the first wrapping station S1 may be spaced from the second wrapping station S2 along the vertical direction V. In this solution, the wrapping stations each comprise a pair of tilters 501 and a pair of tucking devices 502. The pair of tilters 501 and the pair of tucking devices 502 S1 are disposed at 90° to those of the second wrapping station S2. Therefore, the first wrapping station is configured to wrap a pair of lateral walls of the box 2—for example, long walls 204, 205—and the second wrapping station S2 may be configured to wrap another pair of lateral walls of the box 2—for example, short walls 202, 203. The second station is preferably lower down than the first station, along the vertical direction V.

In an example embodiment, the apparatus 1 also comprises an adjustment device 12. The adjustment device 12 is configured to receive the box 2 and the wrapping blank 3 coupled thereto at the infeed I of the apparatus 1 and to align the box 2 with a conveyor belt 13 extending along the horizontal direction H.

The adjustment device 12 is also configured to transport the box 2 to the first wrapping station S1. The adjustment device 12 is movable in the advancing direction F.

More specifically, the adjustment device 12 may include a plurality of suction cups 121 to slightly lift the flap 302 of the blank 3 at the infeed I of the apparatus 1. In particular, the suction cup is operationally gripped on a front flap of the blank to lift it at the infeed I of the apparatus. The adjustment device 12 may also include a pair of squares 122, controlled by motors M responsive to the setting of the apparatus, to check that the box 2 is correctly positioned relative to the conveyor belt 13.

The squares 122 are operationally in contact with the box interposed therein to set a position of the box with respect to the conveyor belt. The adjustment device 12 can include more than one pair of squares 122.

According to an exemplary embodiment, the adjustment device 12 is configured to move in a synchronized manner with the transport rods TR. Therefore, in one example, the transport rods TR and the adjustment device take three consecutive boxes at the same time. Furthermore, the transport rods TR and the adjustment device transport the boxes along the advancing direction in a synchronized manner.

In particular, the transport rods TR and the adjustment device 12 move between a first retracted position in which the framing device 12 takes a first box at the inlet I and the transport rods TR take a second and a third box in the first and in the second wrapping station, respectively, and an advanced position, spaced from the retracted position along the advancing direction F, in which the adjustment device 12 takes the first box in the first wrapping station and the transport rods TR take the second and the third box in the second wrapping station S2 and in the outfeed I of the apparatus, respectively.

According to an aspect of it, this disclosure provides a method for wrapping a cardboard box 2 with a wrapping blank 3 (or simply "blank"). More specifically, by box 2 is meant a container comprising a plurality of lateral walls 202, 203, 204 and 205 and a bottom wall 201. The lateral walls 202, 203, 204 and 205 are interconnected by the bottom wall 201. The lateral walls 202, 203, 204, 205 (and the bottom wall 201) each have an internal face and an external face.

Further, the lateral walls 201, 202, 203, 204 each extend away from the bottom wall 201 from a lower, or connecting edge, to an upper, or free edge.

More specifically, the box illustrated has a pair of end walls 202, 203 (or short walls) and a pair of flanks 204, 205 (or long walls).

The blank 3 is made preferably of paper. The wrapping blank 3 has a base 301 and a plurality of flaps 302, 303, 304 and 305 connected thereto. The flaps of the plurality of flaps of the wrapping blank 3 are connected to each other and each can be confronted by, and coupled to, a respective wall 202, 203, 204 and 205 of the box 2. In this case, each flap wraps both faces (internal and external) of the lateral walls 202, 203, 204 and 205 of the box 2.

The wrapping blank 3 also comprises four side flaps 306, 307, 308 and 309. The side flaps 306, 307, 308 and 309 define a partial extension of two flaps 304 and 305 of the blank 3 in order to completely and uninterruptedly cover all four lateral walls 202, 203, 204 and 205.

Further, the flaps 302, 303, 304 and 305 are each made up of two portions: an inner portion 302*a*, 303*a*, 304*a* and 305*a*, adjacent to the base 301, and an outer portion 302*b*, 303*b*, 304*b* and 305*b*, spaced from the base 301 of the blank 3.

It should be noted that glue is spread on some parts of the blank 3 by a gluer apparatus upstream of the apparatus 1. Alternatively, glue may be spread over the entire surface of the wrapping blank 3.

Before reaching the apparatus 1, the box 2 is received by a forming apparatus and is placed on the pre-glued wrapping blank 3 in such a way that the bottom wall 201 of the box rests on the base 301 of the wrapping blank 3 (FIG. 1).

The method comprises a step of receiving the box 2 coupled to the base 301 of the blank 3. The step of receiving the box 2 may comprise a step of receiving the box 2 at an infeed I along the advancing direction F.

The method may comprise a step of placing the base 301 of the blank 3 and the box 2 coupled thereto on a support structure 4. The support structure 4 may be movable along a vertical direction V. In an example, the method comprises a step of providing a plurality of folding heads 5. The folding heads 5 are configured for performing a plurality of folding operations. The plurality of folding operations may include:

folding the flaps 302, 303, 304, 305 of the wrapping blank 3 from a horizontal position to a vertical position so that an inner portion 302*a*, 303*a*, 304*a*, 305*a* of each flap adheres to an external surface of the lateral wall 202, 203, 204, 205 of the box 2 and an outer portion 302*b*, 303*b*, 304*b*, 305*b* of each flap protrudes vertically from the box 2;

folding the outer portions 302*b*, 303*b*, 304*b*, 305*b* of the flaps from a vertical position to a horizontal position and further folding the outer portions of the flaps towards the inside of the box 2, from the horizontal position to a vertical position, so that they adhere to an internal surface of the lateral wall 202, 203, 204, 205 of the box 2.

In an example embodiment, the folding heads may include a plurality of tilters 501, configured to fold the flaps 302, 303, 304, 305 of the wrapping blank 3 from the horizontal position to the vertical position, so that the inner portion 302*a*, 303*a*, 304*a*, 305*a* of each flap adheres to the external surface of the lateral wall 202, 203, 204, 205 of the box and the outer portion 302*b*, 303*b*, 304*b*, 305*b* of each flap protrudes vertically from the box 2. The tilters 501 may be movable in the vertical direction V relative to the support structure 4 to fold the flaps 302, 303, 304, 305 of the blank 3. The plurality of folding heads 5 may include tucking devices 502 to fold the outer portions 302*b*, 303*b*, 304*b* and 305*b* of the flaps 302, 303, 304 and 305 from the vertical position to the horizontal position inside the box 2.

According to an aspect of this disclosure, the method may comprise a step of providing the tucking devices 502 of each folding head 5 with a pair of fingers 502A. For each pair of fingers, the method comprises a step of moving the fingers 502A along a first horizontal axis H1 towards and away from a corresponding wall of the box into the horizontal position parallel to a bottom wall 201 of the box 2. For each pair of fingers, the method may also comprise step of vertically moving the support structure 4 and each pair of fingers 502A relative to one another, from a raised configuration, where the pair of fingers is located above the box 3, to a lowered configuration, where the pair of fingers 502A is located inside the box 2 in order to fold the outer portions 302*b*, 303*b*, 304*b*, 305*b* of the flaps into the vertical position inside the box 2.

The fingers 502A may be movable reciprocally towards and away from each other. More specifically, the method may comprise a step of placing the fingers 502A at least partially inside the box 2 and a step of moving the fingers reciprocally, in sliding contact with the wrapping blank 3 on the internal surface of the lateral wall 202, 203, 204, 205 of the box. In an example, for each pair of fingers 502A in the lowered configuration, the method also comprises a step of reciprocally moving the fingers along a second horizontal axis H2, orthogonal to the first horizontal axis H1, in sliding contact with the internal surface of the lateral wall 202, 203, 204, 205. In an example, the method may comprise a step of providing each tucking device 502 with a horizontal blade 502B. Further, the step of folding the outer portions of the flaps from the vertical position to the horizontal position may be performed by horizontal blades that move horizontally, parallel to the bottom wall 201 of the box 2 relative to a corresponding side (that is, the lateral walls 202, 203 and 204, 205) of the box. The blade 502B may include a through groove. In this solution, each pair of fingers 502A is operatively inserted inside the groove made in a corresponding blade. Thus, the fingers and the blade 502B are moved simultaneously along a horizontal direction H.

In an example, in the step of placing the fingers 502A inside the box, the pair of fingers is moved from the raised to the lowered configuration, with the fingers located at a position where they are near each other, at a central portion of the corresponding lateral wall of the box. Furthermore, in the lowered configuration, the fingers 502A move alternatingly away from each other along the second horizontal axis H2. Preferably, the fingers are moved from the lowered configuration to the raised configuration when they are spaced from each other, and the fingers are moved reciprocally towards each other when they are in the raised configuration. In an example, the fingers are moved by an actuator that is connected to a control unit. The control unit is configured to receive input data and to derive a setting for the apparatus 1, based on the input data. The input data may represent the size of each box 2 to be wrapped. Thus, the reciprocal movement of the fingers 502A towards and away from each other, between a first position, where they are positioned at a reciprocal minimum distance, and a second position, where they are positioned at a reciprocal maximum distance by the actuator, and where the second position (the maximum distance) is set responsive to the setting of the apparatus 1.

In an example, the plurality of folding heads 5 includes pairs of folding heads. Preferably, for each pair of folding heads 5, the folding heads operate simultaneously on a respective pair of sides of the box 2.

In another example, the method may include a step of folding the flaps from a horizontal position into the box so they adhere to the internal surfaces of the lateral walls 202, 203, 204, 205 of the box. This is done by a horizontal rotating blade 502C configured to move horizontally, parallel to the bottom wall 201 of the box 2 and to rotate about an axis of rotation from a first position, where it is parallel to the bottom wall of the box, to a second position, where it is orthogonal to the bottom wall 201 of the box.

The method may also comprise a step of supporting an internal face of the lateral wall 202, 203, 204, 205 of the box with an arm 6 while the flaps 302, 303, 304, 305 are being folded. Preferably, the arm 6 moves from a first position, where it is clear of the lateral walls 202, 203, 204, 205 of the box, to a second position, where it is in contact with the internal face of the internal wall of the box.

In an example, the method also comprises a step of folding the four side flaps 306, 307, 308 and 309 of the blank 3 so that they adhere to a portion of the internal face of the long lateral walls 204, 205 of the box 2 by means of a plurality of hands 502E. Preferably, the hands 502E are configured to be movable both horizontally and vertically so as to adapt to the size of the box to be wrapped.

Preferably, the folding heads 5 of each pair of folding heads are spaced from each other along a respective working direction W. The support structure 4 may comprise a plurality of pairs of supporting bars 401. The pairs of supporting bars 401 of the plurality of pairs of supporting bars may correspond to the pairs of folding heads of the plurality of pairs of folding heads 5. Preferably for each pair of supporting bars 401, the bars are oriented transversely to the working direction W of the respective pair of folding heads 5. The supporting bars 401 are movable towards and away from each other to support corresponding edges of a bottom wall of the box. Preferably, the supporting bars 401 are moved by a plurality of actuators and responsive to the setting of the apparatus 1.

According to an aspect of this disclosure, the method comprises a step of providing a plurality of columns 7. The method also comprises a step of providing a horizontal tray 8 and connecting the columns 7 to the tray 8. In an example, the method comprises a step of moving the columns 7 horizontally so that at least each vertex of the box 2 is vertically aligned with a corresponding column of the plurality of columns 7.

In an example, during the step of horizontally moving the columns 7, the columns are slidably connected to the tray 8. Alternatively, the step of horizontally moving the columns 7 may include a step of disconnecting the columns from the tray 8 and moving the columns horizontally relative to the tray 8.

Preferably, the step of horizontally moving the columns 7 is performed through the control unit, responsive to a setting of the apparatus 1.

The method may also comprise a step of moving the tray 8 in the vertical direction V. The method comprises a step of vertically moving the columns 7*b* relative to the support structure 4. In the step of vertically moving the columns 7, the columns remain in contact with an internal face of the bottom wall 201 of the box 2 so that the bottom wall 201 of the box is interposed between the support structure 4 and the plurality of columns at least at every vertex of the box while the flaps are being folded from the horizontal position to the vertical position.

The method may comprise a step of providing the tray 8 with a central through hole 801. The method also includes a step of providing a rod 9, inserted through the central hole 801 in the tray and a step of providing a disk 10 and connecting it to a lower end of the rod 9. The rod 9 may be movable relative to the support structure 4 along the vertical direction V.

The method may also comprise a step of inserting the disk 10 into the box 2 in contact with a central portion of the internal face of the bottom wall 201 of the box. The method preferably also comprises a step of vertically moving the rod 9 independently of vertically moving the tray 8.

In an example, the method comprises a step of moving the support structure 4, with the wrapping blank 3 and the box 2 coupled to it, along the vertical direction V to different heights.

In an example, the method comprises a step of inserting the columns 7 into the box 2 so they are in contact with the internal face of the bottom wall 201 of the box 2.

The method may also comprise a step of moving the columns 7 downwards into an active configuration in which the columns are in contact with the internal face of the bottom wall 201 of the box. Preferably, the columns, in the active configuration, are configured for acting in conjunction with the support structure 4 to press the bottom wall 201 of the box interposed between them.

The method may also comprise a step of moving the columns 7 upwards into an inactive configuration where the columns 7 are spaced from the internal face of the box 2.

The method may also comprise a step of holding the disk 10 inside the box 2 in contact with the central portion of the internal face of the bottom wall 201 of the box while the columns 7 are being moved upwards (into the inactive configuration).

In an example, the method comprises a step of moving the box 2 and the wrapping blank 3 vertically between a first stop at a first height and a second stop at a second height lower than the first height.

Preferably, the step of folding the flaps 302, 302, 304, 305 from the horizontal position to the vertical position is performed at the first stop and the step of folding the outer portions 302*b*, 302*b*, 304*b*, 305*b* of the flaps into the box 2 is performed at the second stop.

More specifically, the box 2 and the blank 3 coupled thereto are received at the infeed I at a first height. Preferably, the tray 8, the rod 9, the disk 10 and the columns 7 are positioned above the box 2. The columns 7 may be moved horizontally responsive to the setting of the apparatus 1 and they are positioned inside the box 2 in such a way that they are in contact with the internal face of the bottom wall 201 of the box at least at every vertex of the box and the bottom wall 201 of the box 2 is interposed between the support structure 4 and the plurality of columns at least at every vertex of the box 2. Also, the rod and the disk are positioned inside the box to press the central portion of the internal face of the bottom wall 201 of the box. In an example, the columns 7 and the support structure are then moved along the vertical direction V to move the box 2 from the first height to a second height. During the downward movement of the box, the flaps 302, 303, 304, 305 of the blank are folded from the horizontal position to the vertical position by the plurality of tilters 501. Alternatively, the support structure 4 may remain stationary and the tilters 501 move upwards to fold the flaps 302, 303, 304, 305 of the blank from the horizontal to the vertical position. Once the flaps have been folded from the horizontal to the vertical position, the columns are spaced from the internal face of the box 2, while the disk 10 is still in contact with the internal face of the box 2. The support structure 4 and the rod 9 may perform another downward movement along the vertical direction V so that the outer portions 302*b*, 303*b*, 304*b*, 305*b* are folded into the box 2 by the tucking devices 502. Alternatively, the support structure 4 may remain stationary while the tucking devices 502 of the folding heads 5 move upwards to fold the flaps into the box 2. Next, the support structure 4, together with the rod 9 and the disk 10, can be moved upwards to bring the box 2 to the first height.

According to an aspect of this disclosure. the method may comprise a step of providing the apparatus 1 with a first wrapping station S1 and a second wrapping station S2. In an example, the wrapping stations are spaced from each other along the horizontal direction H, orthogonal to the vertical direction V. More specifically, the method may comprise a step of performing a first subset of the plurality of folding operations in the first wrapping station S1 and performing a second subset of the plurality of folding operations in the second wrapping station S2.

Preferably, the method comprises a step of supporting the base 301 of the blank 3 and of the box 2 coupled thereto, in each wrapping station, by means of a respective support structure 4, 4'. The support structures 4, 4' are according to this disclosure. In an example, the wrapping stations S1, S2 each comprise a plurality of folding heads 5 according to this disclosure. The plurality of folding heads 5 may include a first pair of folding heads 5 and a second pair of folding heads 5'. The folding heads of the first pair of folding heads 5 are spaced from each other along a first working direction W and the folding heads of the second pair of folding heads 5' are spaced from each other along a second working direction W', orthogonal to the first working direction W. The first working direction W may be orthogonal to the second working direction W'. In an example, the first pair of folding heads 5 forms part of the first wrapping station S1 and the second pair of folding heads 5' forms part of the second wrapping station S2. Further, for each pair of folding heads 5, 5', the pairs of folding heads may operate simultaneously on a respective pair of sides (that is, on the lateral walls 202, 203, 204, 205) of the box 2. In the first wrapping station S1, the support structure 4 may include a first pair of supporting bars 401, oriented transversely to the first working direction W, and, in the second wrapping station S2, the support structure 4' may include a second pair of supporting bars 401', oriented transversely to the second working direction W'. Preferably, for each one of the first and second pairs of supporting bars, the bars are movable towards and away from each other, so that they are displaceable, responsive to a setting of the apparatus to support corresponding edges of the bottom wall 201 of the box 2.

In an example, the method may comprise a step of providing each of the wrapping stations S1, S2 with a plurality of columns 7 according to this disclosure. In an example, the plurality of columns 7 comprises a first group of columns 7 and a second group of columns 7'.

The first and the second wrapping station S1, S2 may comprise the first and the second group of columns 7, 7', respectively. In each wrapping station S1, S2, the plurality of columns 7, 7' is oriented orthogonally to the working direction W, W' of the respective pair of folding heads 5, 5'.

In an example, the first wrapping station S1 is located upstream of the second wrapping station S2 relative to an advancing path of the box 2 from the infeed I to the outfeed O of the apparatus 1. Preferably, the first subset of folding operations is performed in the first wrapping station and the second subset of folding operations is performed in the second wrapping station.

The method may comprise a step of transporting the box 2, and the blank 3 coupled thereto, in the advancing direction by means of a transport device 11 that is movable relative to each of the support structures 4, 4'. Preferably, the box 2 is transported from the first wrapping station S1 to the second wrapping station S2 through a translation movement without a rotational movement of the box.

In an example, the box 2 is transported from the first wrapping station S1 to the second wrapping station S2 by a translational movement of the box 2 aligned with the advancing direction F of the box at the infeed I.

More specifically, the method may comprise a step of receiving the box and the blank 3 through an adjustment device 12. The box is aligned with a conveyor belt 13 extending along the horizontal direction H and is transported to the infeed of the first wrapping station S1. The method comprises a step of receiving the box 2 and the blank 3 coupled thereto at the infeed I and at a first height of the first wrapping station S1.

The method may comprise a step of folding a first pair of flaps of the wrapping blank 3—for example, the flaps 304 and 305—from a horizontal position to a vertical position in the first wrapping station S1.

The method may comprise a step of moving the box 2 and the blank 3 coupled thereto, together with the respective support structure 4, along a first vertical axis V at a second height of the first wrapping station S1. The second height is lower than the first height. The method may comprise a step of folding the outer portions **302*b*, 303*b*, 304*b*, 305*b* of the first pair of flaps from a vertical position to a horizontal position and towards the inside of the box 2 from the horizontal position to a vertical position, so that they adhere to an internal surface of the lateral wall 202, 203, 204, 205 of the box 2**.

The method may comprise a step of moving the box 2 to the first height of the first wrapping station S1.

The method may comprise a step of transporting the box 2 to a first height of the second wrapping station by means of the transport device 11. The transport device may receive two consecutive boxes of a succession of boxes simultaneously and moves them along the advancing path, without rotating the box 2, so that the advancing path is aligned with the advancing direction F of the box 2 at the infeed. The device is moved to and fro to move the boxes between different positions between the infeed I, the wrapping stations S1, S2 and the outfeed O.

The method may comprise a step of folding a second pair of flaps of the wrapping blank 3—for example, the flaps 302 and 303—from the horizontal position to the vertical position in the second wrapping station S2. The method may also comprise a step of moving the box 2 and the blank coupled thereto, together with the respective support structure 4', along a second vertical axis at a second height of the second wrapping station. The second height is lower than the first height and the first and second vertical axes are spaced from each other horizontally.

The method may also comprise a step of folding the outer portions **302*b*, 303*b*, 304*b*, 305*b* of the second pair of flaps from the vertical position to the horizontal position and towards the inside of the box 2 from the horizontal position to the vertical position, so that they adhere to an internal surface of the lateral wall 202, 203, 204, 205** of the box.

Preferably, the method comprises a step of moving the box to the first height of the second wrapping station S2. The method comprises a step of releasing the wrapped box 2 at the outfeed O of the apparatus 1.

Alternatively, the method may comprise a step of folding the flaps 302, 302, 304, 305 of the blank from the horizontal position to the vertical position in the first wrapping station. In this solution, the box with the inner portions 302A, 303A, 304A, 305A attached to the lateral walls 202, 203, 204, 205 of the box 2 and the upper portions of the flaps **302*b*, 303*b*, 304*b*, 305*b* in the vertical position is transported to the second wrapping station S2 by the transport device 11. The method comprises a step of folding the outer flaps of the blank into the box 2 in the second wrapping station. Further, in each station, the box 2** may be moved along the vertical direction between different heights.

In another example, the method may comprise a step of positioning the wrapping stations S1, S2 so they are spaced from each other along the vertical direction V. In this solution, the method may comprise a step of folding a pair of flaps of the wrapping blank 3—for example, the flaps 304 and 305—from the horizontal position to the vertical position, so that the inner portion of each flap adheres to the external surfaces of the lateral walls of the box—for example, the walls 204, 205—and the outer portion of each flap protrudes vertically from the box 2, and a step of folding the outer portions of the pair of flaps from the vertical position to the horizontal position and further folding the outer portions of the pair of flaps towards the inside of the box 2 from the horizontal position to the vertical position so that they adhere to the internal surface of the lateral walls of the box.

The method may comprise a step of moving the box along the vertical direction V to bring it to the second wrapping station. The method may also comprise a step of folding another pair of flaps of the wrapping blank 3—for example, the flaps 302 and 303—from the horizontal position to the vertical position, so that the inner portion of each flap adheres to the external surfaces of the lateral walls of the box—for example, the walls 204, 205—and the outer portion of each flap protrudes vertically from the box 2, and a step of folding the outer portions of the pair of flaps from the vertical position to the horizontal position and further folding the outer portions of the pair of flaps towards the inside of the box 2 from the horizontal position to the vertical position so that they adhere to the internal surface of the lateral walls of the box. In other words, one pair of lateral walls of the box 2—for example, the long walls 204, 205—is wrapped in the first wrapping station, and another pair of lateral walls—for example, the short walls 202, 203—is wrapped in the second wrapping station, or vice versa.

The invention claimed is:

1. An apparatus for automatic wrapping of a wrapping blank on lateral walls of a cardboard box, wherein the wrapping blank has a base and a plurality of flaps connected thereto, and wherein the box is coupled to the base of the wrapping blank, the apparatus comprising:

a support structure, configured to support the base of the wrapping blank, so that the wrapping blank and the box coupled thereto are movable in a vertical direction;

a plurality of folding heads, configured to fold the flaps of the wrapping blank from a horizontal position to a vertical position, so that an inner portion of each flap adheres to an external surface of the lateral wall of the box and an outer portion of each flap protrudes vertically from the box, and configured for folding the outer portions of the flaps from a vertical position to a horizontal position, and further to fold the outer portions of the flaps towards the inside of the box from the horizontal position to a vertical position so that they adhere to an internal surface of the lateral wall of the box, wherein each folding head includes a pair of fingers, movable reciprocally towards and away from each other, wherein the pair of fingers is displaceable inside the box, so that the fingers can be reciprocally moved in sliding contact with the wrapping blank on the internal surface of the lateral wall of the box, wherein each folding head further includes a horizontal blade connected to an actuator to move horizontally, parallel to a bottom wall of the box, and to approach and move away from a corresponding wall of the box, wherein the blade is to fold the outer portion of the flaps of the wrapping blank from the vertical position to the horizontal position, and wherein the horizontal blade includes a groove, wherein the respective pair of fingers is operatively inserted inside the groove.

2. The apparatus according to claim 1, wherein each pair of fingers is further movable along a first horizontal axis, towards and away from a corresponding wall of the box, wherein the reciprocating movement of the fingers of the pair is along a second horizontal axis, orthogonal to the first horizontal axis, and wherein the support structure and each pair of fingers are further movable relative to one another vertically, from a raised configuration, wherein the pair of fingers is located above the box, to a lowered configuration, wherein the pair of fingers is located inside the box.

3. The apparatus according to claim 2, wherein, for each folding head, the fingers of the corresponding pair of fingers are movable reciprocally between a first position, where they are positioned at a reciprocal minimum distance, and a second position, where they are positioned at a reciprocal maximum distance, the pair of fingers is displaceable inside the box with the fingers in the first position, the folding head is configured to move the fingers away from each other from the first position to the second position, with the pair of fingers in the lowered configuration.

4. The apparatus according to claim 3, wherein each folding head is configured to move the fingers approaching each other from the second position to the first position, with the pair of fingers in the raised configuration.

5. The apparatus according to claim 1, comprising:

a control unit, adapted to receive input data representative of the size of each box to be wrapped and programmed to derive a setting for the apparatus, based on the input data;

a plurality of actuators connected to the control unit and configured to move the folding heads, wherein the plurality of actuators includes a sliding actuator, configured for moving the fingers reciprocally towards and away from each other, between a first position, where they are positioned at a reciprocal minimum distance, and a second position, where they are positioned at a reciprocal maximum distance, and wherein the second position is set responsive to the setting of the apparatus.

6. The apparatus according to claim 1, comprising:

a control unit, adapted to receive input data representative of the size of each box to be wrapped and programmed to derive a setting for the apparatus, based on the input data;

a plurality of actuators connected to the control unit and configured to move the folding heads, wherein the plurality of folding heads includes pairs of folding heads, wherein, for each pair of folding heads, the folding heads are operatively active simultaneously on a respective pair of sides of the box, the folding heads of the pair are spaced from each other along a respective working direction, and wherein the support structure includes plurality of pairs of supporting bars, corresponding to the plurality of pairs of folding heads, wherein, for each pair of supporting bars, the bars are oriented transversally to the working direction of the respective pair of folding heads and are movable towards and away from each other, so that they are displaceable, responsive to the setting of the apparatus, to support corresponding edges of a bottom wall of the box.

7. The apparatus according to claim 1, including:

a first wrapping station and a second wrapping station placed distanced from each other along a horizontal direction, orthogonal to the vertical direction;

a transport device, configured for transporting the box from the first wrapping station to the second wrapping station, through a translation of the box along the horizontal direction, without rotation of the box.

8. The apparatus according to claim 1, further comprising a plurality of columns, movable both vertically and horizontally, so that the columns of the plurality of columns contact an internal face of a bottom wall of the box at least in every vertex of the box.

9. The apparatus according to claim 8, further comprising:

a rod movable along a vertical direction;

a disk connected at a lower end of the rod and configured to contact a central portion of the internal face of the bottom wall of the box.

10. The apparatus according to claim 1, wherein the support structure is adapted for moving along the vertical direction between a first stop at a first height and a second stop at a second height lower than the first height and wherein the folding heads are configured to fold the flaps of the wrapping blank from the horizontal position to the vertical position, with the support structure located at the first stop, and are configured for folding the outer portions of the flaps from the vertical position to the horizontal position, and further from the horizontal position to the vertical position so that they adhere to an internal surface of the lateral wall of the box, with the support structure located at the second stop.

11. A method for wrapping a cardboard box with a wrapping blank, the wrapping blank having a base and a plurality of flaps to be applied on lateral walls of the box, the method comprising the following steps:

receiving the box coupled to the base of the wrapping blank;

placing the base of the wrapping blank and the box coupled thereto on a support structure movable along a vertical direction;

folding the flaps of the wrapping blank from a horizontal position to a vertical position so that an inner portion of each flap adheres to an external surface of the lateral wall of the box and an outer portion of each flap protrudes vertically from the box;

folding the outer portions of the flaps from the vertical position to a horizontal position;

further folding the outer portions of the flaps of the wrapping blank towards the inside of the box, from the horizontal position to a vertical position, so that they adhere to an internal surface of the lateral wall of the box;

providing a plurality of folding heads, wherein each folding head includes a pair of fingers movable reciprocally towards and away from each other;

placing the fingers at least partially inside the box and moving the fingers reciprocally, in sliding contact with the wrapping blank on the internal surface of the lateral wall of the box, wherein the folding of the outer portion of the flaps from the vertical position to the horizontal position is carried out by horizontal blades, moving horizontally and parallel to a bottom wall-of the box with respect to a corresponding side of the box, and wherein each pair of fingers is operatively inserted inside a groove provided in a corresponding blade.

12. The method according to claim 11, further comprising the following steps:

for each pair of fingers, moving the fingers along a first horizontal axis, towards and away from a corresponding wall of the box into the horizontal position parallel to a bottom wall of the box;

for each pair of fingers, vertically moving the support structure and each pair of fingers-relative to one another, from a raised configuration, wherein the pair of fingers is located above the box, to a lowered configuration, wherein the pair of fingers is located inside the box in order to fold the outer portion of the flaps into the vertical position inside the box, for each pair of fingers, in the lowered configuration, reciprocatively moving the fingers along a second horizontal axis, orthogonal to the first horizontal axis, in sliding contact with the internal surface of the lateral wall.

13. The method according to claim 12, wherein, in the step of placing the fingers inside the box, the pair of fingers is moved from the raised to the lowered configuration, with the fingers located in a position wherein the fingers are near each other, at a central portion of the corresponding lateral wall of the box, and wherein the fingers, in the lowered configuration, move reciprocatively away from each other along the second horizontal axis.

14. The method according to claim 13, wherein the fingers are moved from the lowered configuration to the raised configuration when they are positioned away from each other, and wherein the fingers are moved reciprocally towards each other when they are in the raised configuration.

15. The method according to claim 11, further comprising the following steps:

providing a first wrapping station and a second wrapping station distanced from each other along a horizontal direction, orthogonal to the vertical direction, wherein the plurality of folding heads includes a first pair of folding heads, spaced from each other along a first working direction, and a second pair of folding heads, spaced from each other along a second working direction orthogonal to the first working direction, and wherein the first pair of folding heads is part of the first wrapping station and the second pair of folding heads is part of the second wrapping station, for each pair of folding heads, wherein the pairs of folding heads are operatively active simultaneously on a respective pair of sides of the box;

wherein the supporting structure includes in the first wrapping station, a first pair of supporting bars, oriented transversally to the first working direction, and, in the second wrapping station, a second pair of supporting bars, oriented transversally to the second working direction, wherein, for each one of the first and second pairs of supporting bars, the bars are movable towards and away from each other, such that they are displaceable, responsive to a setting of the apparatus derived by a control unit, to support corresponding edges of a bottom wall of the box;

transporting the box from the first wrapping station to the second wrapping station through a translation movement without a rotational movement of the box.

16. The method according to claim 11, comprising the steps of:

providing a plurality of columns;

moving the columns downwards, relatively to the support structure, in contact with an internal face of a bottom wall of the box at least in every vertex of the box, so that the bottom wall of the box is interposed between the support structure and the plurality of columns at least in every vertex of the box;

moving the box and the wrapping blank vertically between a first stop at a first height and a second stop at a second height lower than the first height, wherein the folding of the flaps from the horizontal position to the vertical position occurs at the first stop, and wherein the folding of the outer portion of the flaps inside the box occurs at the second stop.

17. An apparatus for automatic wrapping of a wrapping blank on lateral walls of a cardboard box, wherein the wrapping blank has a base and a plurality of flaps connected thereto, and wherein the box is coupled to the base of the wrapping blank, the apparatus comprising:

a support structure, supporting the base of the wrapping blank, so that the wrapping blank and the box coupled thereto are movable in a vertical direction;

a plurality of folding heads, each folding head of the plurality of folding heads being operable to fold the respective flap of the wrapping blank from a horizontal position to a vertical position, so that an inner portion of each flap adheres to an external surface of the lateral wall of the box and an outer portion of the flap protrudes vertically from the box in a vertical position, fold inwardly the outer portion of the flap from the vertical position to a horizontal position, and fold the outer portion of the flap inside of the box towards the bottom wall of the box, from the horizontal position to a vertical position so that the flap adheres to an internal surface of the respective lateral wall of the box, wherein each folding head includes a pair of fingers, wherein, in one operative configuration of the machine, the fingers of the pair of fingers are arranged inside the box and are moved away from one another in sliding contact with the wrapping blank folded in adhesion to the internal surface of the lateral wall of the box, wherein each folding head further includes a horizontal blade connected to an actuator to move horizontally, parallel to a bottom wall of the box, and to approach and move away from a corresponding wall of the box, wherein the blade is to fold the outer portion of the flaps of the wrapping blank from the vertical position to the horizontal position, and wherein the horizontal blade includes a groove, wherein the respective pair of fingers is operatively inserted inside the groove.

18. The apparatus according to claim 17, wherein, for each folding head of the plurality of folding heads, the pair of fingers is movable along a first horizontal axis, the fingers of the pair of fingers being movable away from each other along a second horizontal axis, orthogonal to the first horizontal axis, and along a vertical direction, orthogonal both to the first horizontal axis and to the second horizontal axis, from a raised configuration, wherein the pair of fingers is located above the box, to a lowered configuration, wherein the pair of fingers is located inside the box.

* * * * *